(12) United States Patent
Shimizu et al.

(10) Patent No.: US 9,640,144 B2
(45) Date of Patent: May 2, 2017

(54) PROJECTOR, FIGURE INPUT/DISPLAY APPARATUS, PORTABLE TERMINAL, AND PROGRAM

(75) Inventors: Hiroshi Shimizu, Tokyo (JP); Kazuhiko Yoshizawa, Ibaraki (JP); Motoyuki Suzuki, Tokyo (JP); Hideo Nishijima, Ibaraki (JP); Nobuo Masuoka, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/377,245

(22) PCT Filed: Feb. 13, 2012

(86) PCT No.: PCT/JP2012/000927
§ 371 (c)(1),
(2), (4) Date: Aug. 7, 2014

(87) PCT Pub. No.: WO2013/121455
PCT Pub. Date: Aug. 22, 2013

(65) Prior Publication Data
US 2015/0002435 A1    Jan. 1, 2015

(51) Int. Cl.
*G06F 3/14*    (2006.01)
*G09G 5/12*    (2006.01)
(Continued)

(52) U.S. Cl.
CPC ............ *G09G 5/12* (2013.01); *G06F 3/0416* (2013.01); *G06F 3/04883* (2013.01);
(Continued)

(58) Field of Classification Search
CPC .. G09G 5/12; G09G 2354/00; G09G 2370/00; G06F 3/0416; G06F 3/04883;
(Continued)

(56) References Cited

U.S. PATENT DOCUMENTS

| 5,465,370 A | 11/1995 | Ito et al. |
| 2004/0150627 A1* | 8/2004 | Luman .................... H04L 67/38 345/173 |

(Continued)

FOREIGN PATENT DOCUMENTS

| CN | 101998106 A | 3/2011 |
| JP | 63-283271 A | 11/1988 |

(Continued)

OTHER PUBLICATIONS

Office Action, mailed Dec. 15, 2015, which issued during the prosecution of Japanese Patent Application No. 2013-558576, which corresponds to the present application.
(Continued)

*Primary Examiner* — Premal Patel
(74) *Attorney, Agent, or Firm* — Baker Botts L.L.P.

(57) ABSTRACT

Blocking a view of a whiteboard by a position of an attendee writing thereon is prevented, and writing records made by all attendees are stored to use the writing records including a course of the written records later. Each terminal of the attendees has a touch-panel-equipped terminal can divide any input line drawing on the terminal into line segment data, successively transmit the line segment data to the controller, and display line drawing information on the display of the touch-panel-equipped terminal. A liquid crystal projector having a controller that can be embedded therein or connected thereto is provided, the controller can sequentially record line drawing information transmitted from each touch-panel-equipped terminal in a data base, add the line drawing information to a video image memory of the whiteboard, and project the video image memory contents onto a wall surface while transmitting information of the data base to each touch-panel-equipped terminal.

23 Claims, 22 Drawing Sheets

(51) Int. Cl.
*G06F 3/0488* (2013.01)
*G06K 9/22* (2006.01)
*H04M 3/56* (2006.01)
*H04N 9/31* (2006.01)
*G06F 3/041* (2006.01)
*G06Q 10/10* (2012.01)
*H04N 7/15* (2006.01)

(52) U.S. Cl.
CPC .......... *G06F 3/1423* (2013.01); *G06F 3/1454* (2013.01); *G06K 9/222* (2013.01); *G06Q 10/101* (2013.01); *H04M 3/567* (2013.01); *H04N 9/3179* (2013.01); *G09G 2354/00* (2013.01); *G09G 2360/04* (2013.01); *G09G 2370/16* (2013.01); *H04N 7/15* (2013.01)

(58) Field of Classification Search
CPC ..... G06F 3/1423; G06F 3/1454; G06K 9/222; H04M 3/567; H04N 9/3179; H04N 7/15; H04N 7/152; H04N 7/157; H04N 7/181
See application file for complete search history.

(56) References Cited

U.S. PATENT DOCUMENTS

| | | |
|---|---|---|
| 2008/0284841 A1 | 11/2008 | Modai et al. |
| 2011/0047485 A1 | 2/2011 | Takakura |
| 2012/0082424 A1* | 4/2012 | Hubner ................ H04N 21/242 386/219 |
| 2013/0091440 A1* | 4/2013 | Kotler .................... G06Q 10/10 715/753 |

FOREIGN PATENT DOCUMENTS

| | | | |
|---|---|---|---|
| JP | 5-233995 | A | 9/1993 |
| JP | H05-300147 | A | 11/1993 |
| JP | 6-296210 | A | 10/1994 |
| JP | H07-177482 | A | 7/1995 |
| JP | H08-265473 | A | 10/1996 |
| JP | 2002-055771 | A | 2/2002 |
| JP | 2004-317583 | A | 11/2004 |
| JP | 2006-005589 | A | 1/2006 |
| JP | 2007-243919 | A | 9/2007 |
| JP | 2008-116874 | A | 5/2008 |
| JP | 2008-269525 | A | 11/2008 |
| JP | 2010-271855 | A | 12/2010 |
| JP | 2011-028619 | A | 2/2011 |
| JP | 2011-045028 | A | 3/2011 |
| JP | 2012-011245 | A | 1/2012 |

OTHER PUBLICATIONS

Office Action, mailed Feb. 14, 2017, which issued during the prosecution of Japanese Patent Application No. 2013-558576, which corresponds to the present application.

* cited by examiner

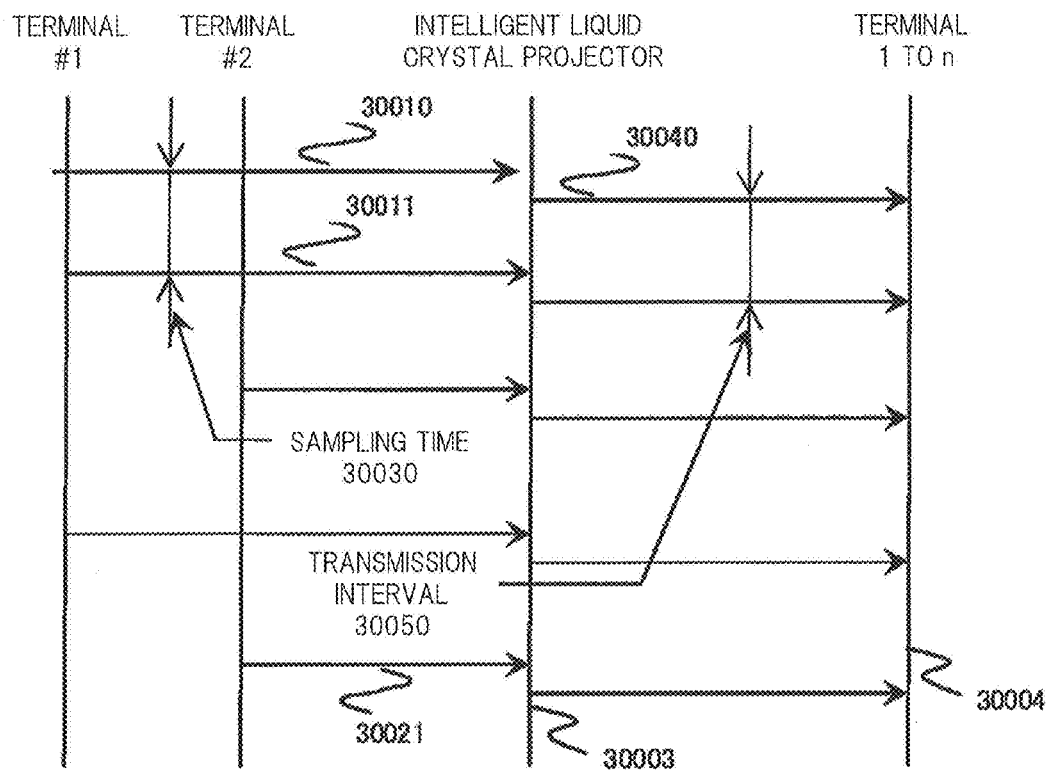
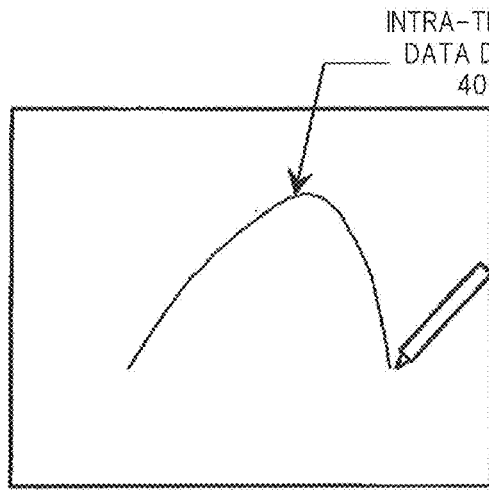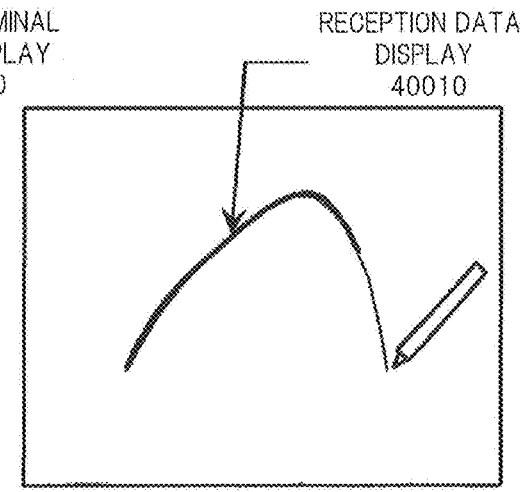

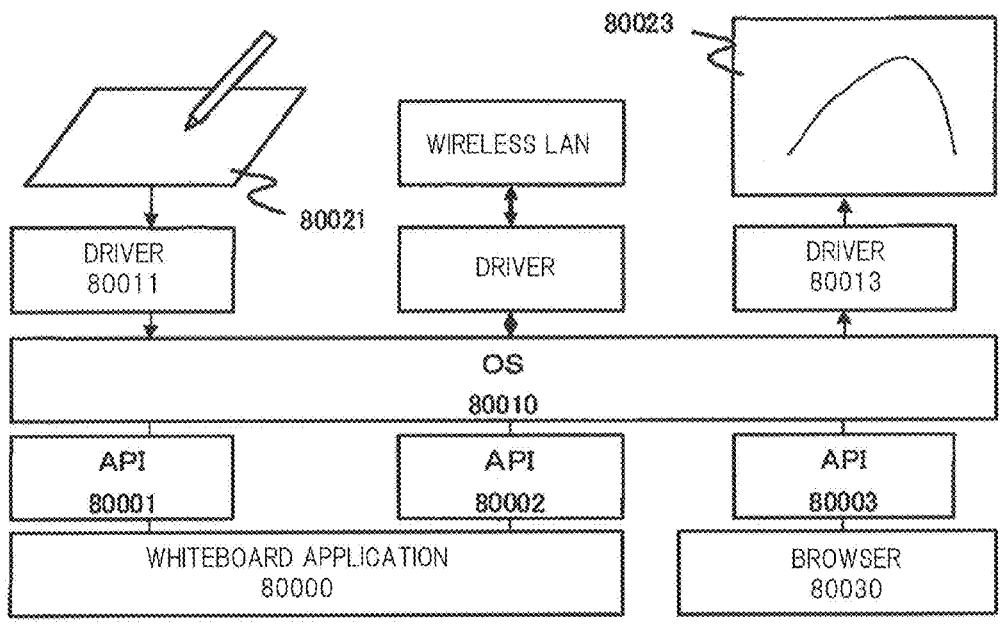

INSTRUCTION COMMAND OF LINE IMAGE DRAWING BY
CANVAS FUNCTION OF HTML5

| | |
|---|---|
| `<canvas id="myCanvas" width="400" height="300"></canvas>` | CANVAS INITIAL SETTING FOR LINE IMAGE DRAWING |
| context.beginPath(); | RESET OF PRESENT PATH |
| context.moveTo(100, 100); | SET OF START POINT OF PATH TO (x=100, y=100) |
| context.lineTo(375,250); | SET OF END POINT OF LINE TO (x=375, y=250) |
| context.lineWidth = 10; | ASSIGNMENT OF LINE WIDTH |
| context.strokeStyle = "#0000FF"; | ASSIGNMENT OF LINE COLOR |
| context.stroke(); | PRACTICAL DRAWING OF LINE IN ACCORDANCE WITH THE ABOVE-DESCRIBED COMMANDS ON CANVAS |

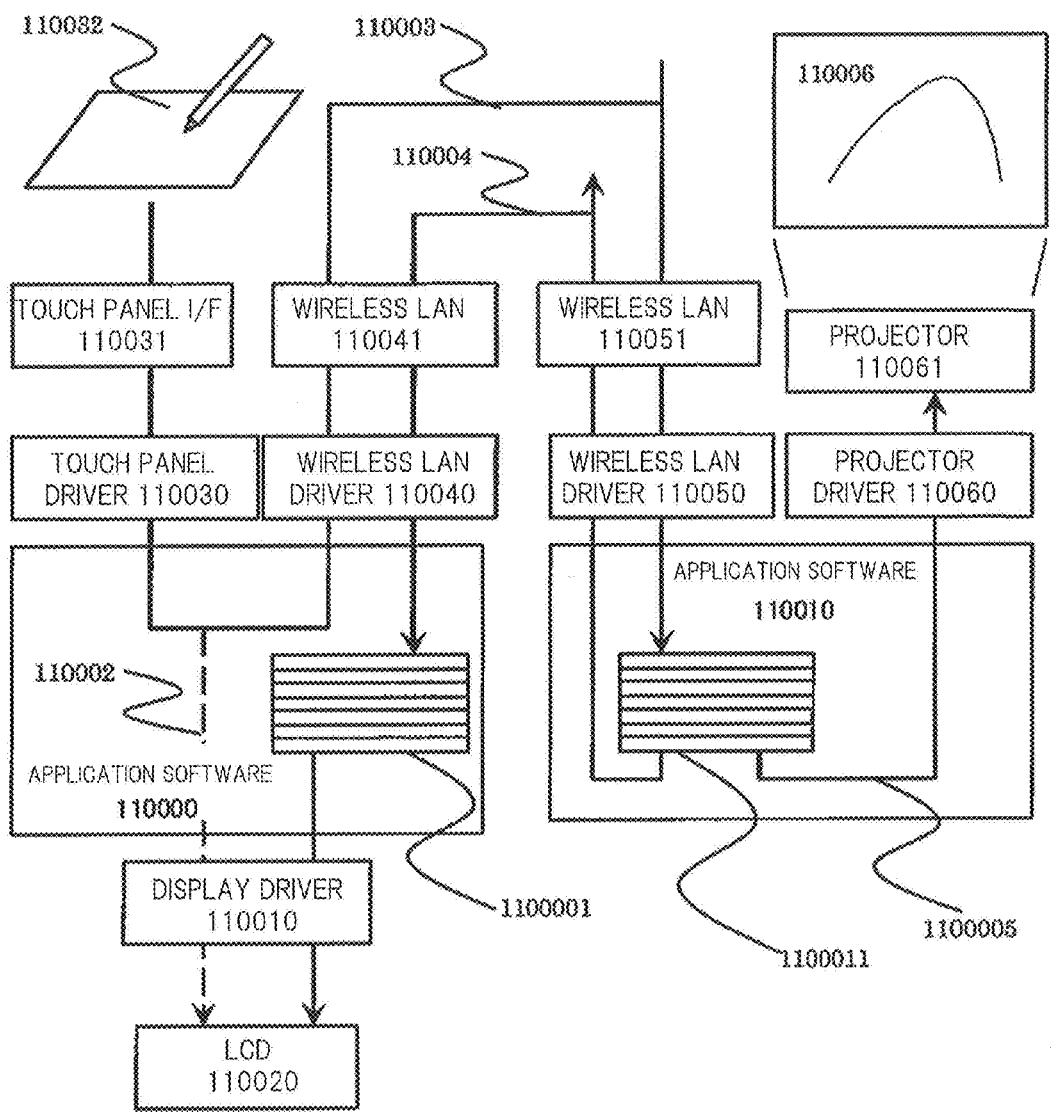

OPERATIONAL EXAMPLE 1 OF
TOUCH-PANEL INPUT RECEPTION

OPERATIONAL EXAMPLE 2 OF
TOUCH-PANEL INPUT RECEPTION

OPERATIONAL EXAMPLE OF TERMINAL DISPLAY

OPERATIONAL EXAMPLE OF
PROJECTOR RECEPTION

OPERATIONAL EXAMPLE OF
PROJECTOR TRANSMISSION

US 9,640,144 B2

PROJECTOR, FIGURE INPUT/DISPLAY APPARATUS, PORTABLE TERMINAL, AND PROGRAM

TECHNICAL FIELD

The present invention relates to an electronically-built figure input/display apparatus that allows a plurality of attendees to simultaneously perform free handwriting input and correction at a meeting, presentation, etc.

BACKGROUND ART

Usually, at a meeting or presentation that is particularly required to proceed as new matters are proposed, it is desirable to prepare a large screen which is as large as a blackboard, allows direct handwriting, correction, deletion, alteration, etc., on the screen, and allows all attendees to simultaneously view the screen.

Generally, a whiteboard with a white panel on which the writing, the correction, and the deletion can be made using a non-permanent (whiteboard) marker is used effectively at small- and middle-scale meetings. As such a whiteboard, a whiteboard having a function that scans a final written result by an image scanner and prints the scanned data on paper to save a copy of a meeting result is also utilized.

Further, as a method of saving and managing the copy of the meeting result, Patent Document 1 of prior art documents describes inventions of a plurality of terminal devices each having a handwriting input device and a method of collecting pieces of information handwriting-input at each terminal device into a server, setting a handwriting input area of each terminal for each specific area in a display window of the server, and displaying information input at each terminal.

Also, Patent Document 2 describes a data format that is adequate for transmitting a handwritten line input at a tele-writing device through a still image communication device, as a digital signal.

PRIOR ART DOCUMENTS

Patent Documents

Patent Document 1: Japanese Patent Application Laid-Open Publication No. 2008-269525
Patent Document 2: Japanese Patent Application Laid-Open Publication No. H06-296210

DISCLOSURE OF THE INVENTION

Problems to be Solved by the Invention

A solution to a problem to be solved by the present invention is not to prevent viewing a whiteboard due to writing and editing operations on the whiteboard which can be simultaneously viewed by all attendees. Also, another solution is to provide means for viewing meeting proceedings including the course of a written report later so as to usefully utilize information on discussions, etc., at the meeting in order to effectively progress the meeting and make an action based on the meeting results.

Accordingly, a preferred aim of the present invention is to improve convenience for a user at a meeting, etc., using a projector and a terminal.

Means for Solving the Problems

A preferred aim of the present invention can be achieved by a configuration described in claims as one example.

Effects of the Invention

According to the present invention, convenience for a user at a meeting, etc., using a projector and a terminal can be improved.

BRIEF DESCRIPTIONS OF THE DRAWINGS

FIG. 3 is an explanatory diagram illustrating output of a data packet from each terminal, transmission of data from each terminal to a projector, and redelivery of a data packet from the projector to the terminal in the figure input/display apparatus and the portable terminal;

FIGS. 4A and 4B are explanatory diagrams each illustrating a display method executed when a line drawing is inputted to a terminal device with a touch panel in the figure input/display apparatus and the portable terminal;

FIGS. 8A and 8B are explanatory diagrams each explaining a second embodiment indicating a relation between a software structure and a hardware structure of the figure input/display apparatus and the portable terminal;

FIGS. 11A and 11B are explanatory diagrams each illustrating a flow of drawing data handled by the figure input/display apparatus and the portable terminal;

DESCRIPTIONS OF THE PREFERRED EMBODIMENTS

Hereinafter, specific embodiments of a figure input/display apparatus according to the present invention will be explained with reference to drawings.

Figure 1:
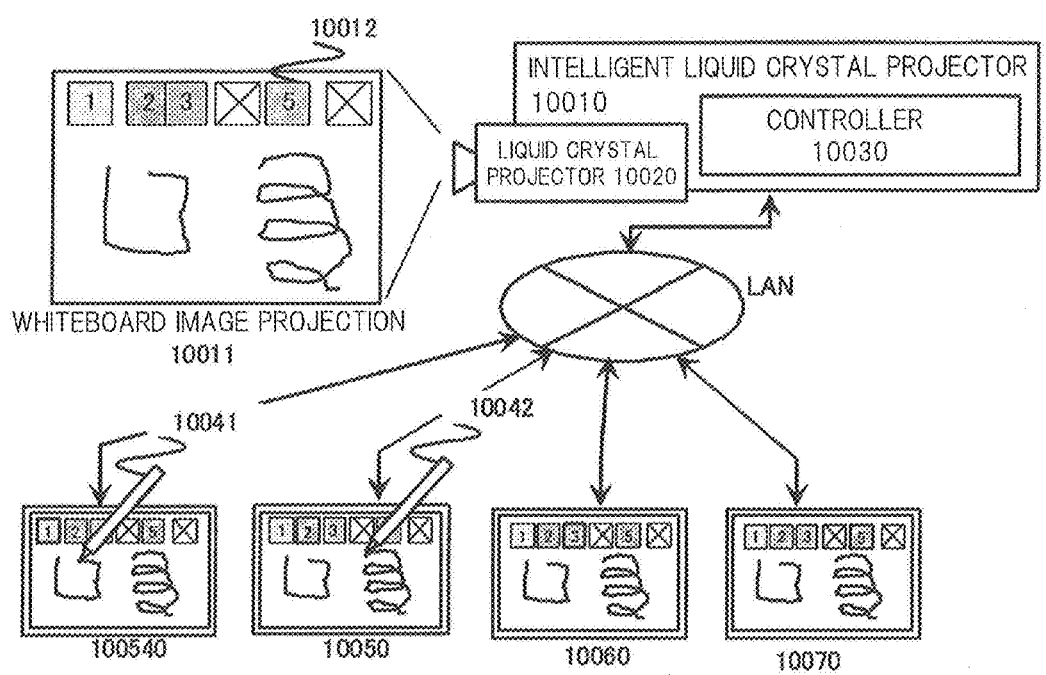
FIG. 1 is an explanatory diagram illustrating connections among devices configuring a figure input/display apparatus and a portable terminal and illustrating a specific operation image.

FIG. 1 is an explanatory diagram illustrating connection among devices configuring a figure input/display apparatus and a portable terminal according to the present invention and illustrating a specific operation image.

A device that projects an image of a whiteboard onto a wall surface or a screen is an intelligent liquid crystal projector 10010. This intelligent liquid crystal projector includes a liquid crystal projector 10020 and a controller 10030, and the liquid crystal projector 10020 and the controller 10030 may be embedded into the same housing as each other or may be configured as separate components so as to use a system in which projection image data is transmitted by the controller 10030 to the liquid crystal projector 10020 in a form of an analog or digital signal. The transmitted projection image is projected on the wall surface (10011), and can be viewed as an image on a large screen by all attendees at the meeting. Each of the attendees at the meeting has a touch-panel-equipped terminal (10040 to 10070) having a touch panel and a display equal in size with the touch panel that are combined together, and can input or edit handwritten line drawings on the touch panel using a pen (10041, 10042).

In this embodiment, the controller in the intelligent liquid crystal projector 10010 is connected to each touch-panel-equipped terminal (10040 to 10070) via a wireless LAN (Local Area Network). As this LAN environment, a wireless LAN environment shared in an ordinary office or others may be used. However, in the present embodiment, the LAN environment is configured as a LAN environment in which a closed connection environment is established only between the controller 10030 serving as a router and each touch-panel-equipped terminal (10040 to 10070) connected to the controller 10030 with provision of an IP address from the controller. At the start of a meeting, a communication connection environment is built by delivering IP addresses to a plurality of touch-panel-equipped terminals whose MAC addresses, etc., are already registered with the controller, operating the touch-panel-equipped terminals brought by meeting attendees using operation switches on the controller, and inputting ID codes, etc. projected from the controller onto the liquid crystal projector, to the terminals.

A specific operation will be explained below. In a line inputted on each touch-panel-equipped terminal (10040 to 10070) with a pen (10041, 10042), line images are simultaneously inputted by two terminals of the touch-panel-equipped terminal (10040) and the touch-panel-equipped terminal (10070) in this example. That is, two line images are simultaneously extending on a finally-displayed whiteboard image, and the whiteboard image is displayed as if two attendees physically simultaneously input the line images on a conventional whiteboard.

The same image as the projected whiteboard image 10011 is displayed simultaneously on each touch-panel-equipped terminal (10040 to 10070), and each meeting attendee can write more or correct on the latest whiteboard image while viewing the images.

On the projected image and the image displayed on the touch-panel-equipped terminal (10040 to 10070), an icon 10012 indicating a condition of each of the touch-panel-equipped terminals (10040 to 10070) of the attendees attending the meeting is also superimposed and displayed. This embodiment is in a state in which four terminals attend the meeting. In a meeting system in this example, six terminals can attend at the maximum, and the fourth and sixth attendees are absence or the fourth and sixth touch-panel-equipped terminals are not operated. The respective touch-panel-equipped terminals (10040 to 10070) used by the attendees attending the meeting are identified as a terminal ID #1 (10040), a terminal ID #2 (10050), a terminal ID #3 (10060), and a terminal ID #5 (10070). The terminal with the terminal ID #1 (10040) and the terminal with the terminal ID #2 (10050) among them are in a state in which the line images are simultaneously inputted.

FIG. 2 is an explanatory diagram of data handling and a data format for simultaneously inputting and displaying a plurality of line segments, in the figure input/display apparatus and the portable terminal according to the present invention.

Figure 2A:
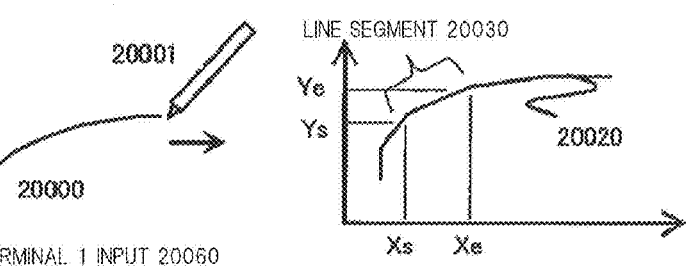
FIGS. 2A and 2B are explanatory diagrams of data handling and a data format for simultaneously inputting and displaying a plurality of line segments in the figure input/display apparatus and the portable terminal.

As illustrated in FIG. 2A, a line image 20000 inputted on the touch-panel-equipped terminal with a pen 20001 is converted into aggregation 20020 of line segments 20030 configured of a plurality of straight line segments through a conversion process 20010 in the terminal.

Each line segment is handled with start points "Xstart" (hereinafter, referred to as "Xs") and "Ystart" (hereinafter, referred to as "Ys") and "Xend" (hereinafter, referred to as "Xe") and "Yend" (hereinafter, referred to as "Ye").

Figure 2B:
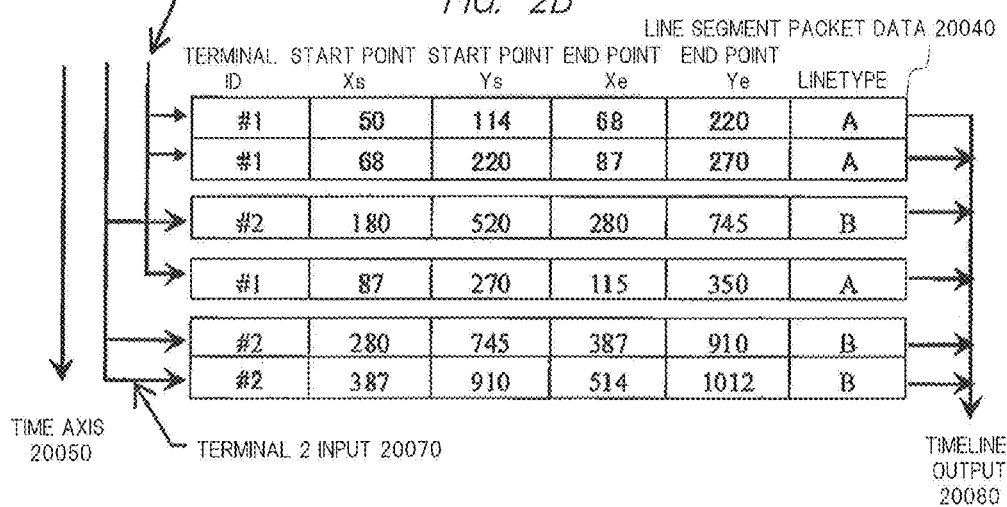

FIG. 2B illustrates a data format in which each of line segments created by dividing an input line image is handled as a data packet 20040. Each data packet is configured of the terminal ID of the terminal on which the line segment is inputted, coordinates of the start point and end point, and a line color, a line thickness, and a line type described later, data of a line type in accordance with various use methods such as an eraser and a laser pointer.

The pieces of line segment data are inputted by each terminal along a time axis 20050. At each terminal, a user can input one line image (20060 in FIG. 2A) so that the user intends to draw and input the line image with one stroke. Practically, however, the controller 10030 receives the line image with a mixture of input (20060) from the terminal 1 and an input (20070) from the terminal 2 for each line segment created by dividing the line image at a predetermined sampling time interval.

The received data packets 20040 are stored in the controller 10030 as a data list sorted in an order of reception, and are outputted from the controller to a video memory unit not illustrated and to each touch-panel-equipped terminal on which the whiteboard image is built on timeline in the order of reception (20080). The video memory unit which has received the output writes each piece of line segment data in the video memory itself as image data in the order of the received packet data. Similarly, each terminal which has received builds each piece of line segment data in the video memory itself as image data and outputs the image data.

This method allows such a process that the line images simultaneously inputted by a plurality of attendees are viewed as if a plurality of lines are apparently simultaneously extending on the screen.

FIG. 3 is an explanatory diagram illustrating output of a data packet from each terminal, data transmission to the projector, and redelivery of a data packet from the projector to the terminal, in the figure input/display apparatus and the portable terminal according to the present invention.

The data packet indicating the line segment data output from the terminal #1 (30001) is generated at each predetermined sampling time, and is transmitted as each line-segment unit such as 30010, 30011, and 30012 to the controller 30003 of the intelligent liquid crystal projector at. From the terminal #2, the data packet indicating the line segment data generated at each predetermined sampling time is similarly transmitted as 30020 and 30021 to the controller 30003 in asynchronous with the transmission data.

The controller receives these data packets, and stores these data packets in the order of reception, displays them on the liquid crystal projector in the order of reception, and redelivers them to each terminal 30004. This redelivery is operated at a predetermined timing interval. For example, the data packets are transmitted at a transmission rate adjusted to a frame timing of the projector or a display device of a display unit of each terminal.

In this manner, the lines which are simultaneously written on the terminals #1 and #2 and which are extending as being written are displayed as simultaneously extending on the same screen in the projector image projected on the large screen on the wall surface or the display unit of the touch-panel-equipped terminal of each attendee, so that the input line images from the plurality of terminals can be viewed so as to apparently simultaneously display the line images.

FIG. 4 is an explanatory diagram illustrating a display method executed when the line image is inputted on the touch-panel-equipped terminal device in the figure input/display apparatus and the portable terminal of the present invention.

As described in FIG. 3, the line segment data inputted on the touch panel of each terminal is transmitted to the controller once, is synthesized with the input data from other terminals, and then, is retransmitted to each terminal again, and is displayed. In this case, from the writing of the line on the touch panel by using the pen until the practical display of the line, a time delay is slightly caused between time of the line input by the pen and the display time of the line at which the line is practically displayed on the terminal by the time taking for the data transmission/reception to/from the controller and the synthesis of the data by the controller, and therefore, even if the line is drawn, the line is not displayed instantly, which is inconvenience for the user.

In this embodiment, first, as illustrated in FIG. 4A, the touch-panel-equipped terminal device displays an instant line based on the line image data inputted by using the pen. By a terminal-inclusive data display 40000, such a line image as the original one by using the pen is instantly displayed without any time difference as described above, and therefore, such a natural input as if the attendee writes a line directly on a paper by using a pen can be performed.

Next, the line segment data redelivered from the controller is displayed. A reception data display 40010 displays a line image so as to trace an already written and displayed line image and follow the line image with the above-described delay time difference. Basically, as this line, the same as the line drawn by using the pen for the first time but is displayed, the line received as the line categorized in a display format such as color and thickness is displayed in order to distinguish the display from the display in the terminal. This reception data display 40010 displayed later is the line image formally drawn on the whiteboard.

Figure 5:
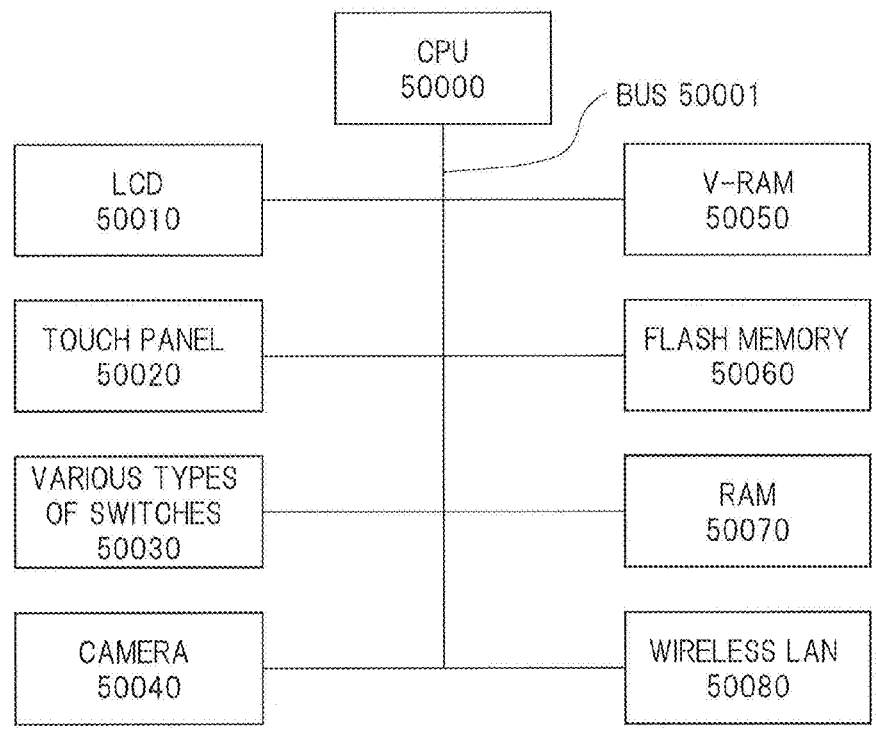
FIG. 5 is an example of a block diagram illustrating a system configuration in the figure input/display apparatus and the portable terminal.

FIG. 5 is an example of a block diagram illustrating a system structure of the portable terminal in the figure input/display apparatus and the portable terminal according to the present invention.

In this embodiment, a configuration of an ordinary computer system is used for the portable terminal. Various hardware devices are connected with each other through a bus 50001 with a CPU 50000 at the core of the system, each hardware device has a hardware interface embedded therein but not illustrated so as to control data input, storage, output, and others in accordance with control by a program operated on a CPU.

The terminal with the CPU serving as the system core includes: an LCD 50010 serving as a display device; a V-RAM (Video-RAM) 50050 that builds an image to be displayed on the display device; a touch panel 50020 that detects a touch by a pen or finger as a coordinate value in a state of overlap on the LCD; a flash memory 50060 that stores a program and basic data to be executed by the CPU 50000; various switches 50030 for turning ON/OFF a power source for the terminal and adjusting a backlight; a RAM 50070 used as a work area by the CPU 50000; an image data input device such as a camera 50040 other than the touch panel; and a wireless LAN 50080 through which the line segment data created by converting the input line image is transmitted and received. As described above, each device has the interface not illustrated to be connected to the CPU bus 50001, so that the program operated on the CPU can process the input/output data to/from each device.

Figure 6:
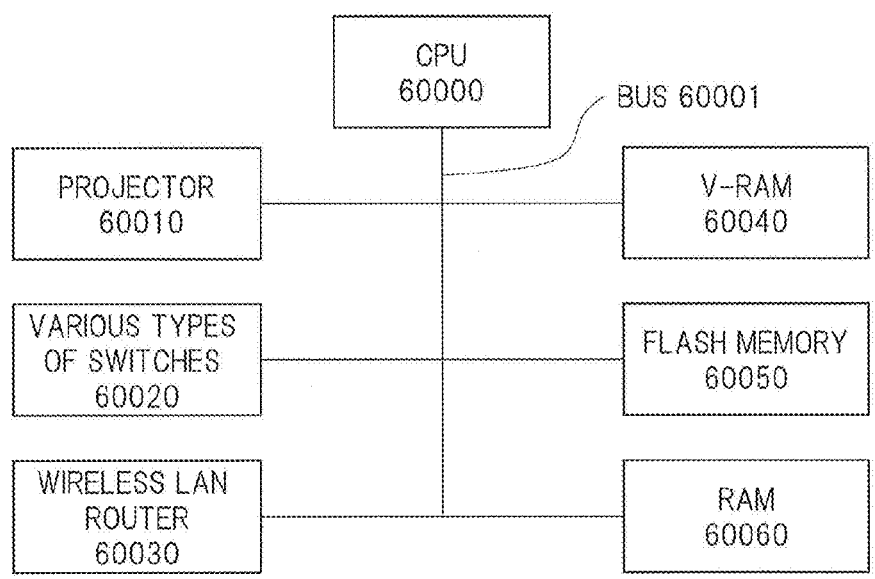
FIG. 6 is an example of a block diagram illustrating a system configuration of an intelligent liquid crystal projector in the figure input/display apparatus and the portable terminal.

FIG. 6 is an example of a block diagram illustrating a system structure of the intelligent liquid crystal projector in the figure input/display apparatus and the portable terminal according to the present invention.

In this embodiment, as similar to the terminal of FIG. 5, a configuration of an ordinary computer system is used for the intelligent liquid crystal projector has. Various hardware devices are connected to each other by using a bus 60001 with a CPU 60000 at the core of the system, and each hardware device embeds a hardware interface therein but not illustrated so as to control data input, storage, output, and others in accordance with control by a program operated on the CPU.

The intelligent liquid crystal projector with the CPU serving as the system core includes: an internal or external projector 60010; a V-RAM (Video-RAM) 60040 that builds an image to be transmitted to and displayed on the projector; various switches 60020 for turning ON/OFF a power source and performing various operations; a flash memory 60050 that stores a program and basic data executed by the CPU 60000; a RAM 60060 used as a work area by the CPU 60000; and a wireless LAN router 60030 that provides an IP address to each touch-panel-equipped terminal to build a LAN and that receives and retransmits the line segment packet transmitted from each terminal. Each device has the interface as described above but not illustrated, and is connected to the CPU bus 60001, so that the program operated on the CPU can process the input/output data to/from each device.

FIG. 7 is an explanatory diagram of a first embodiment illustrating a relation between a software structure and a hardware structure in the figure input/display apparatus and the portable terminal according to the present invention.

Figure 7A:
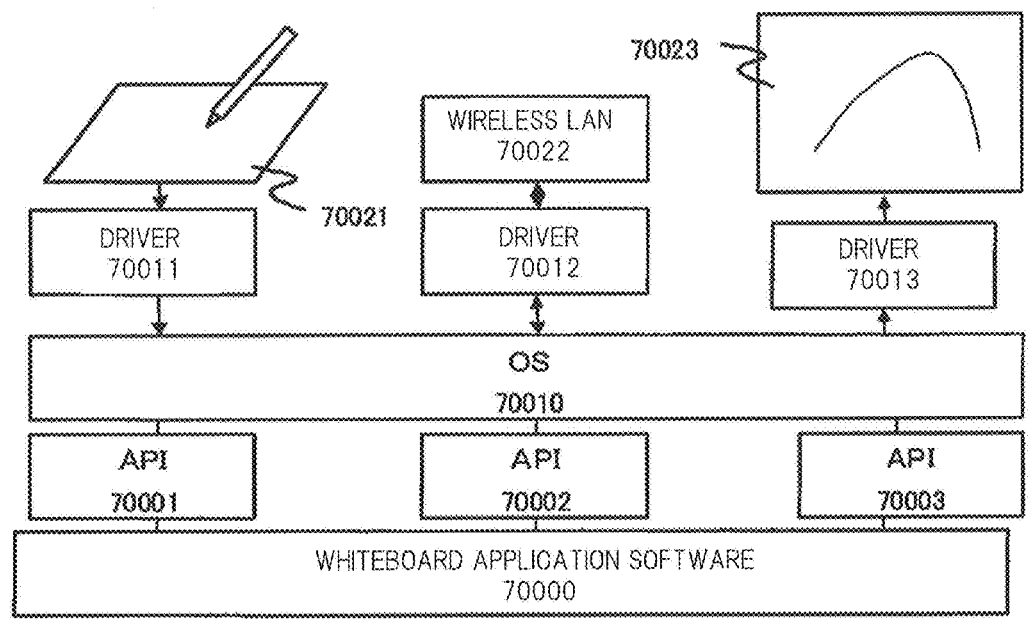
FIGS. 7A and 7B are explanatory diagrams each explaining a first embodiment indicating a relation between a software structure and a hardware structure of the figure input/display apparatus.

FIG. 7A illustrates a configuration of the terminal device. The terminal device operates under overall control by an operating system (hereinafter, referred to as "OS") 70010, and a whiteboard application 70000 is executed under control of the OS. The whiteboard application is connected to the OS via application interfaces (hereinafter, referred to as "API") 70001, 70002, and 70003 for each hardware device, so that the whiteboard application transmits/receives data to/from each hardware device via the OS.

Data that configures the handwritten line image inputted on a touch panel 70021 is inputted by a touch panel driver 70011 to the OS, and is inputted to the whiteboard application through the API 70001. At this time, as the sampling timing described in FIG. 3, the sampling is performed at a timing of instruction from the whiteboard application to the OS for loading the coordinate on the touch panel so as to load the coordinate in such a contact case that the pen or finger is in contact with but not separated from the touch panel, to convert the data into the packet data for each line segment as described in FIG. 2, and to display the packet data on an LCD through the API 70003, the OS 70010, and an LCD driver 70013 (70023). At the same time, the packet data is transmitted from the wireless LAN 70022 to the intelligent liquid crystal projector through the API 70002, the OS 70010, and the wireless LAN driver 70012.

Figure 7B:
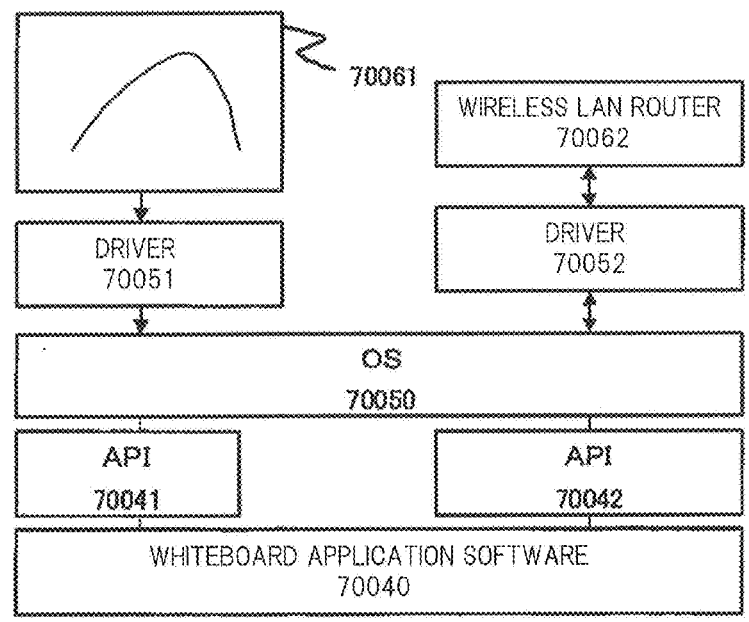

FIG. 7B illustrates a configuration of the intelligent liquid crystal projector, particularly, a configuration of the controller. The intelligent liquid crystal projector operates under overall control by an OS 70050, and a whiteboard application 70040 is executed under control of the OS. The whiteboard application is connected to the OS via application interfaces (hereinafter, referred to as "API") 70041 and 70042 for each hardware device so that the whiteboard application transmits/receives data to/from each hardware device via the OS.

A wireless LAN router 80062 is connected to each terminal, and the line segment data configuring the handwritten line image transmitted from the connected terminal is inputted to the OS by a wireless LAN driver 70052, and then, is inputted to the whiteboard application through the API 70042. This data is transmitted from the plurality of terminals, the pieces of data are compiled into a data list in an order of reception timeline and are stored by the whiteboard application, and are transmitted to a liquid crystal projector hardware device through the API 70041 and the OS 70050 at the same time by a liquid crystal projector driver 70051, and then, are displayed as a projection screen 70061.

At the same time, the aggregation of the line segment data received from the plurality of terminals is redelivered to each terminal through the API 70042 and the OS 70050 from the wireless LAN driver 70052 by electric wave transmission of the wireless LAN router 70062.

The redelivered data is converted into the packet data for each line segment as described in FIG. 2, and is displayed on the LCD (70023) through the API 70003, the OS 70010, and the LCD driver 70013. At the same time, the data is transmitted to the intelligent liquid crystal projector through the API 70002 and the OS 70010, and the wireless LAN driver 70012 from the wireless LAN 70022.

Here, the stored data packet in FIG. 7B can be destroyed at the time of the display on the liquid crystal projector and the retransmission to each terminal. However, by storing all pieces of data during a meeting, the data can be left as such recordings of meeting that the writing onto the whiteboard during the meeting is stored on timeline. In addition, when an additional terminal attends the meeting in progress, the discussion made before the attendance can be checked as information displayed on the whiteboard by transmitting the data packet generated from the start of the meeting to the terminal. By the storage on each terminal illustrated in FIG. 7A, proceedings of the meeting from the start of the meeting can be checked at any time in the middle of the meeting, and the data can be also left as the records of the meeting at each terminal.

FIG. 8 is an explanatory diagram illustrating a second embodiment indicating a relation between a software structure and a hardware structure in the figure input/display apparatus and the portable terminal according to the present invention.

FIG. 8A illustrates the configuration of the intelligent liquid crystal projector of FIG. 7B, particularly the configuration of the controller, and the structure is the same as the structure illustrated in FIG. 7B. Therefore, detailed description of the structure will be omitted.

The present embodiment has a feature that not a whiteboard application 80000 but a Web browser which is a general-purpose display program is used as a program for processing the display image to be displayed on the liquid crystal projector.

A homepage description language called HTML5 has a function of setting an attribute such as the start point/end point of the line segment as illustrated in FIG. 8B, a color thereof, and a width thereof and of displaying an arbitral line segment in addition to a conventional function of graphic image display based on image data. Using this function, The line segment data outputted by the whiteboard application using the function is converted into the description language HTML5, and then, is inputted to a browser 80030 through an API 80002, an OS 80010, and an API 80031, and the browser 80030 projects a whiteboard image 80023 through the API 80031, the OS 80010, and a liquid crystal projector driver 80013.

Although not illustrated in FIG. 8, also as similar to the terminal device, a general-purpose browser can be used by adding a browser and an API in FIG. 7A, so that an apparatus whose form does not depend on a hardware specification of an output device can be particularly provided.

FIG. 9 is an explanatory diagram illustrating a UI that makes a conversation only between specific terminals during the meeting to make an exclusive conversation by using a component device of the figure input/display apparatus and the portable terminal according to the present invention.

Although operations of the hardware devices and communication applications are not illustrated, when an IP address is delivered by the wireless LAN router, and then, a conversation request and conversation are made between the terminals having their unique IP addresses such as making from the terminal 1 to the terminal 5, either way may be used, the way being direct communication between the terminals having the same IP addresses and being communication on a communication route through the whiteboard application.

In this embodiment, two terminals work as user interfaces. FIG. 9 illustrates a case where the terminal 1 calls the terminal 5.

As described in FIG. 1, the ID names 90002 of the terminals attending the same meeting are arranged with a form of icons on an upper part of a terminal screen (90000). The terminals are distinguished from each other by their differences in not only the number but also an icon color, and a terminal not attending the meeting or turned off is displayed with a cross so as to disappear. And, for the own terminal, a frame line of the icon is displayed with a thick line.

Figure 9A:
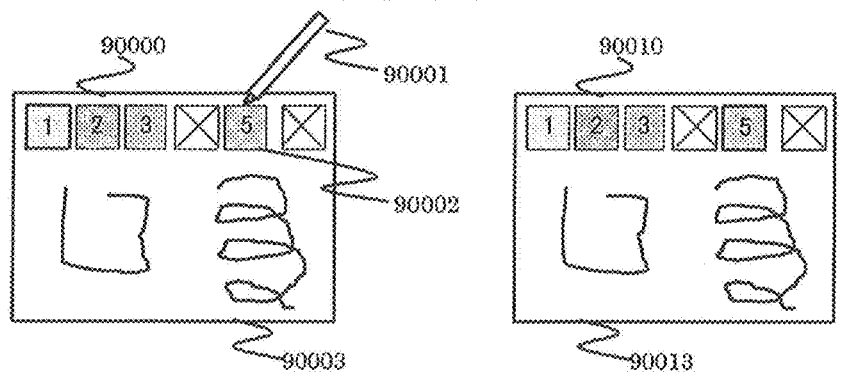
FIGS. 9A to 9D are explanatory diagrams each illustrating a UI in which conversation is made among only specific terminals during a meeting, using component devices of the figure input/display apparatus and the portable terminal.

In FIG. 9A, when the user of the terminal 1 on the left side desires to communicate with the user of the terminal 5, the user of the terminal 1 touches the icon of the terminal 5 by using a pen 90001. At this point, the terminal 5 on the right side does not receive a call from the terminal 1 yet, and therefore, the same screen as the projected whiteboard screen is displayed as described in FIG. 1 (90010).

Figure 9B:
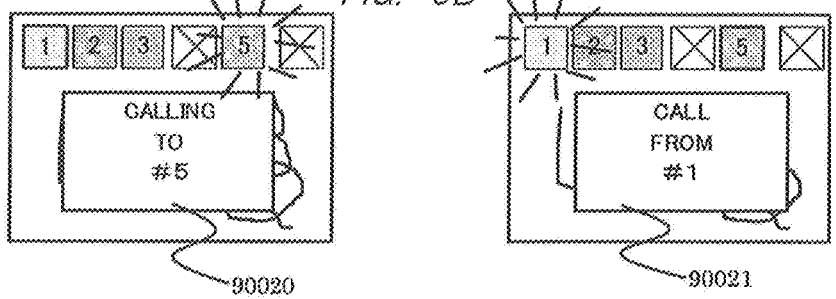

When the call from the terminal 1 to the terminal 5 is started in FIG. 9B, a window 90020 indicating a state during the calling is displayed on the screen of the terminal 1. And, a window 90021 indicating the call from the terminal 1 is displayed on the screen of the terminal 5. At the same time, the icon of the terminal 5 blinks on the screen of the terminal 1 while the icon of the terminal 1 blinks on the screen of the terminal 5 to display the indication of the occurrence of the call to the users.

Here, when the user of the terminal 5 desires to respond the call from the terminal 1, the user may touch the icon of the terminal 1. Alternatively, when the user desires to cancel the call, the user may touch the window 90021 indicating the call from the terminal 1. When the user of the terminal 1 also desires to suspend the call during the calling, the user may touch the window 90020. Although not illustrated, the user may touch an icon indicating the response to the call, an icon indicating rejection of the call, or an icon indicating cancellation of the call by a caller which are separately displayed on the window or a corner of the screen during the calling.

Figure 9C:
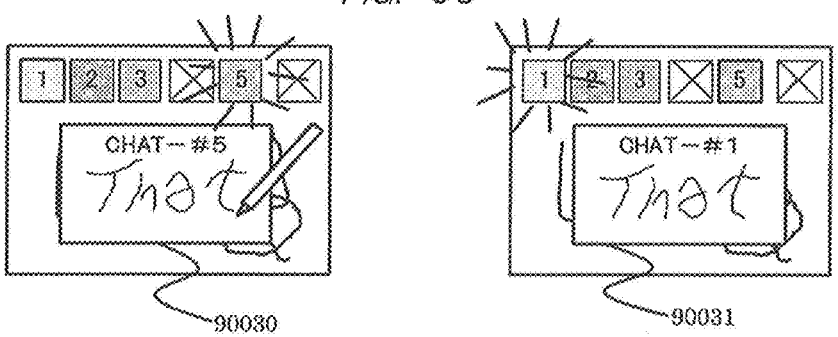

FIG. 9C illustrates screens obtained when the terminal 5 response to the call from the terminal 1 and starts communicating with the terminal 1. On both terminals, windows 90030 and 90031 displaying "CHAT-1" and "CHAT-5" are displayed, respectively. As these windows, the call-indicating windows of FIG. 9B may be transferred as they are. These windows serve as input screens similarly functioning as the whiteboards on which only the communication between the terminal 1 and the terminal 5 is displayed, and the two terminals can communicate with each other by inputting characters on these windows in handwriting. A method of transmitting/receiving data at this time can be achieved by the same method of dividing the input line image into the line segments and transmitting/receiving the line segment data in the figure input/display apparatus as illustrated in FIGS. 1 and 2.

Each of the windows 90030 and 90031 is displayed so as to cover the whiteboard of the entire meeting in this case, and therefore, the display is in a state in which the whiteboards cannot be viewed during the communication between the two terminals. In this case, for example, the user drags the part indicated as "CHAT-#5" or "CHAT-#1" on the upper part of the window displayed on each of both terminals with touching the part by the pen or finger so as to move a position of the window, and therefore, the user can refer the whiteboard of the entire meeting on a background. Although not illustrated, providing such a display form that a translucent window covers the entire touch panel and adding the display form to the whiteboard of the entire meeting, an operation of the communication only between the two terminals is achieved. These operations can be executed by the whiteboard application of FIG. 7.

FIG. 10 is an explanatory diagram illustrating a method of displaying by which user the line in progress of the writing is written, in the figure input/display apparatus and the portable terminal according to the present invention.

Figure 10A:
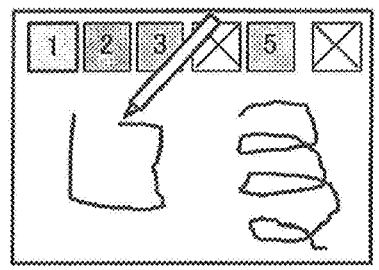
FIGS. 10A to 10C are explanatory diagrams each illustrating a method of displaying by which user a line in progress of the line drawing is written, in the figure input/display apparatus and the portable terminal.

FIG. 10A illustrates the display screen 100000 of the terminal #1, on which a drawing line on a left side of the screen is being inputted with a pen 100001.

Figure 10B:
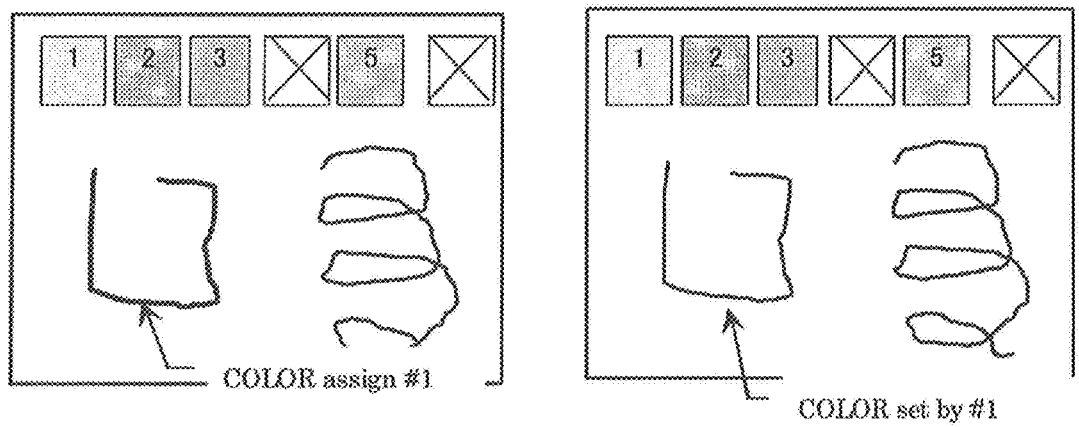

FIG. 10B illustrates a screen projected by the figure input/display apparatus and a screen displayed on a different terminal in which the left screen is in a state during the line drawing by the terminal #1 and the right screen is in a state of completion of the line drawing by the terminal #1, more specifically a state after elapse of predetermined time since the pen is separated from the screen.

For the line in the state during the line drawing, the line drawing is displayed with a color indicating the terminal #1, more specifically a color indicating the icon of the terminal #1. And, when the line drawing is completed, the line color is changed to a color which is previously specified by the terminal #1, normally a color of the pen used on the whiteboard to which the writing is physically performed, such as a black color if all users use the same color in the writing for a color, e.g., the black color. At this moment, the line drawing by the terminal #1 is completed, so that the screen of the terminal #1 is used for the discussion in the progression of the meeting.

Here, if two or more terminals such as the terminals #1 and #2 are drawing the lines, on the left screen in FIG. 10B, each line color during the drawing is drawn with the same color of the icon indicating the ID of the terminal on which the line drawing is in progress, is changed to the color set by each terminal after elapse of predetermined time since the line drawing is completed so as to indicate the completion of the line drawing.

Figure 10C:
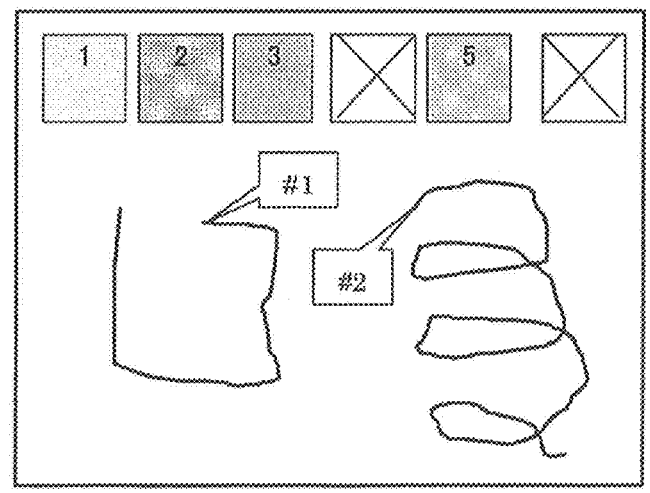

FIG. 10C illustrates an example of a method for the line-drawing display in a case of simultaneous line drawing by a plurality of terminals, which is different from the method of FIG. 10B. A drawing line on the left side of the screen is a line during the line drawing by the terminal #1, and a drawing line on the right side of the screen is a line during the line drawing by the terminal #2.

At this time, each of balloon messages 100030 and 100040 indicating the line drawing by the terminal #1 is displayed on an end point of each drawing line, i.e., on an edge point of each line extended so as to follow the drawing of each terminal in accordance with the elapse of time, and a position of the message is moved so as to follow movement of the edge point. And, when the predetermined time elapses after the completion of the drawing, the color is changed as similar to the case of FIG. 10B, the screen is treated as a screen for the discussion in the progress of the meeting.

FIG. 11 is an explanatory diagram of a flow of drawing data handled by the figure input/display apparatus and the portable terminal of the present invention.

The data flow is explained in the explanation of FIG. 11, and therefore, data transfer destination is illustrated in a diagram with mixture of software and hardware.

First, a handwritten drawing inputted to a touch panel 10032 is inputted to an application 110000 through a touch panel driver 110030. Here, the drawing data is divided into the line segment data described in FIG. 2, and is transmitted to the controller of the intelligent liquid crystal projector from a wireless LAN 110041 through a wireless driver 110040.

The line-segment packet data transmitted from a wireless LAN 110051 is received by the controller, enters an application 110010 through a wireless LAN driver 110050, and is collectively stored in a line-segment data packet 110001. The line-segment data packet is stored in a state of mixture of pieces of line-segment packet data inputted from the plurality of terminals as described in FIG. 2B.

The stored pieces of line-segment packet data are retrieved in the order of the storage (110005), and are inputted to a projector 110061 through a projector driver 110060, and are projected as a large-screen whiteboard image 110062. At the same time, the line-segment packet data is redelivered through the wireless LAN driver 110050 and the wireless LAN 110051 to each terminal (110004), and is collectively stored in a line-segment packet data 110001 in the terminal through the wireless LAN 110041 and the wireless LAN driver 110040 of each terminal. And, as similar to the case of the controller, the data is retrieved in the order of input, and is displayed on the LCD 110020 of the terminal through a display driver 110010.

Here, when the drawing data inputted in the handwriting which is transmitted to the controller once, and then, is redelivered, and is drawn as illustrated in FIG. 4A, a time difference in timing is caused between handwriting timing and display timing, and the user feels strange on the drawing operation. In order to prevent this problem, the data inputted on the touch panel 110032 is transmitted to the controller, and at the same time, is displayed on the LCD 110020 as indicated by a dotted line 110002. Then, the redelivered data is displayed, so that the redelivered drawing data can be can be displayed so as to follow the extending of the drawing line in a real-time manner as illustrated in FIG. 4B.

FIGS. 12A to 12D are explanatory diagrams each illustrating a flowchart of operation of a flow of the drawing data handled by the figure input/display apparatus and the portable terminal of the present invention.

Figure 12A:
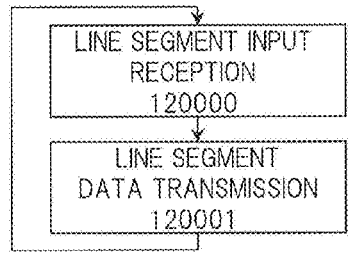
FIGS. 12A to 12E are explanatory diagrams each illustrating an operation of a flow of drawing data handled by the figure input/display apparatus and the portable terminal by using a flowchart.

FIG. 12A is a part for input and transmission of the drawing data in the touch-panel-equipped terminal, and corresponds to 110003 in FIG. 11. That is, the drawing received on the touch panel is received as the line segment data (120000), and is transmitted for each line segment (120001).

Figure 12B:
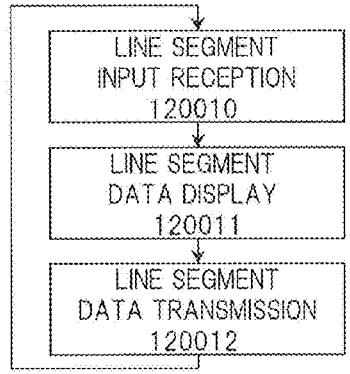

FIG. 12B is also a part for input and transmission of the drawing data in the touch-panel-equipped terminal. FIG. 12B illustrates a case of display of the drawing data on the terminal first as in the case of FIG. 4A, and includes 110002 in FIG. 11. That is, the drawing received on the touch panel is received as the line segment data (120010), is displayed on the LCD of the terminal (120011), and is transmitted for each line segment data (120012).

Figure 12C:
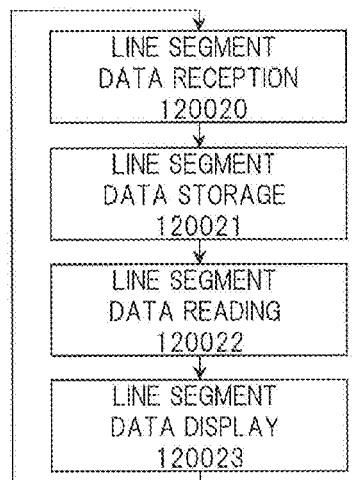

FIG. 12C illustrates an operation of the terminal receiving the line segment data retransmitted from the projector, and corresponds to mainly an operation of storage and reading to and from the line-segment packet data 110001 of FIG. 11. The terminal receives the line segment data first (120020), stores the received line segment data in the line-segment packet data (120021), reads the line segment data (120022), and displays the read line segment data on the LCD (120023).

Figure 12D:
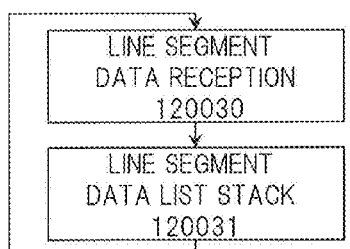

FIG. 12D is an example of a reception operation by the projector, and corresponds to mainly an operation of storage and reading of the line segment data to and from the line-segment packet data 110011 of FIG. 11. The projector receives the line segment data transmitted from each terminal (120030), and stacks and stores the received line segment data in the line-segment packet data for every one reception (120031).

Figure 12E:
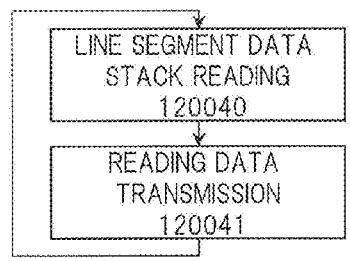

FIG. 12E illustrates retransmission of data by the projector, and corresponds to 1100004 in FIG. 11. As the line segment data stacked and stored in the line-segment packet data, pieces of the line segment data from the plurality of terminals are mixed at this moment, the pieces of line segment data are read out in the order of storage (120040), and the pieces of the read data which are the mix data from respective terminals are then redelivered to the respective terminals.

FIG. 13 is an explanatory diagram illustrating rewinding/replay of the whiteboard image in the progress of the meeting in the figure input/display apparatus and the portable terminal according to the present invention.

By recoding all of the line segment data packets described in FIG. 7B from the start of the meeting as described in FIGS. 11 and 12E, for example, an attendee who attends the meeting in the middle of the meeting can check the proceedings of the whiteboard input again from the beginning of the meeting, and an attendee who has attended the meeting from the beginning can also play back the records from the beginning of the meeting. In this embodiment, the UI for performing this operation will be described.

Figure 13A:
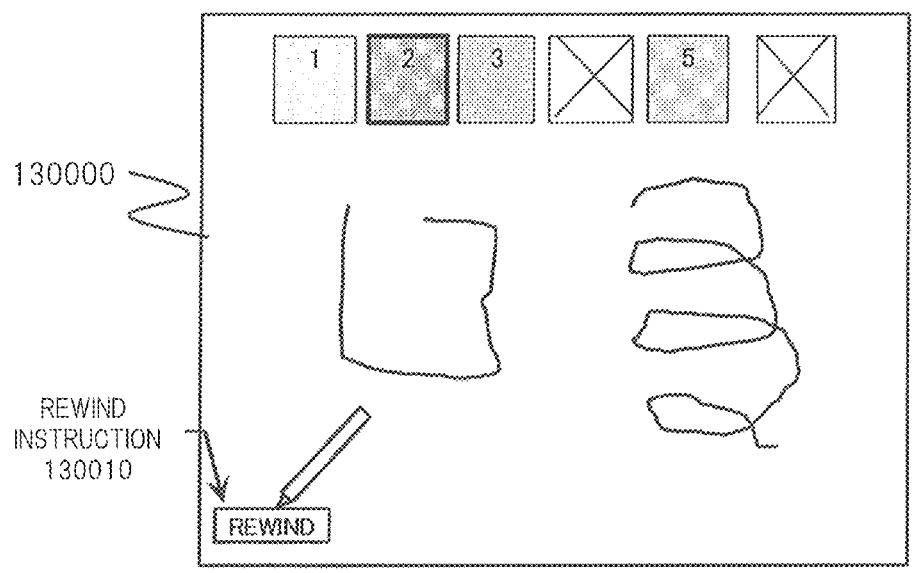
FIGS. 13A and 13B are explanatory diagrams each illustrating rewinding/replay operation of a whiteboard image in the course of the meeting in the figure input/display apparatus and the portable terminal.
Figure 13B:
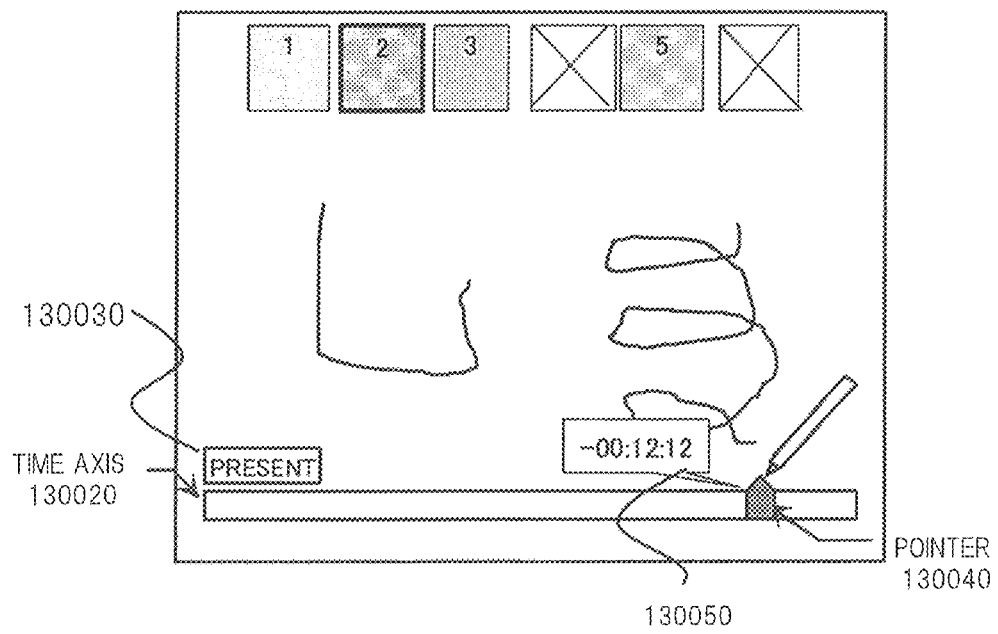

FIG. 13A illustrates the screen of each touch-panel-equipped terminal of FIG. 1. A feature here is to provide and display a rewinding instruction (130010) button on the lower left side of the screen. When the user touches the rewinding instruction button in the middle of the meeting, the screen changes as illustrated in FIG. 13B. Here, a bar 1330020 indicating a time axis whose horizontal axis indicates time from the start of the meeting to the current time is displayed on a lower side of the screen, and a pointer 130040 is displayed above the time axis. By assigning the pointer with the pen and dragging the pointer left and right, the displayed current screen can be changed to a screen viewed at a point of time traced back by predetermined time from the latest screen. The traced back time is displayed as 130050, and a screen viewed 12 minutes behind of the latest screen is displayed here.

These operations can be executed by the whiteboard application illustrated in FIG. 7.

Figure 14A:
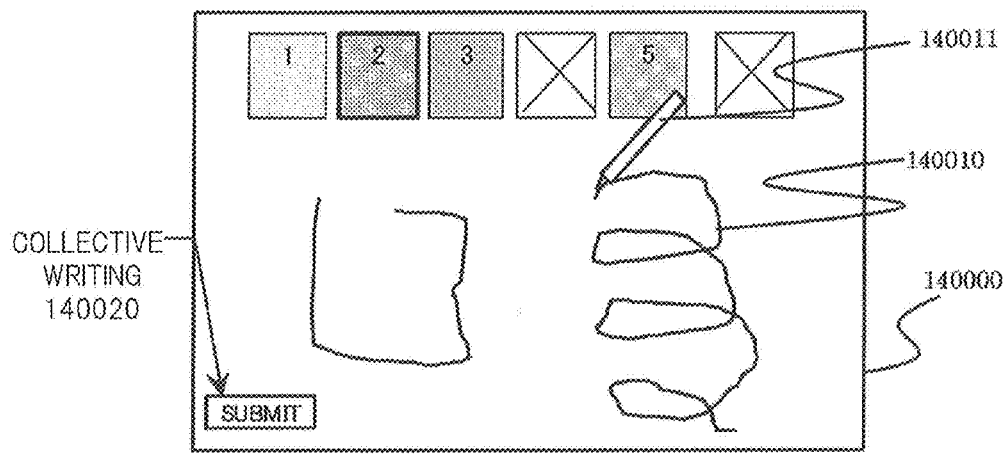
FIGS. 14A to 14C are explanatory diagrams each illustrating a method of drawing all of certain line drawings drawn by attendees first, and then, collectively displaying the line drawings, in the figure input/display apparatus and the portable terminal.
Figure 14B:
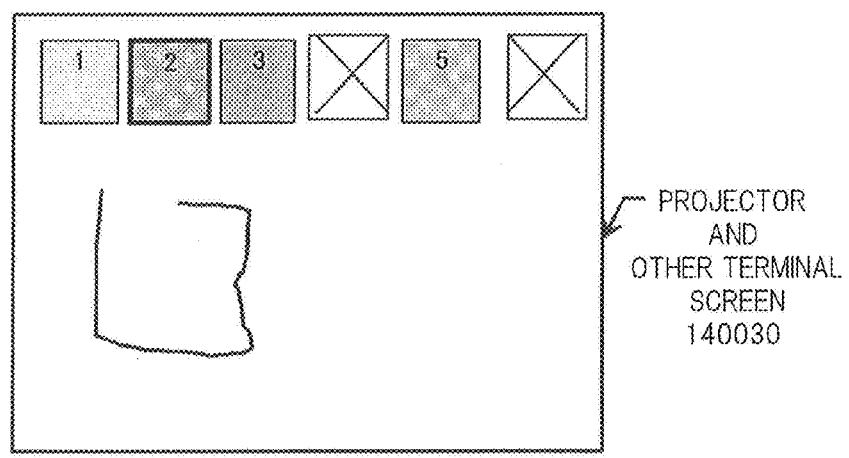
Figure 14C:
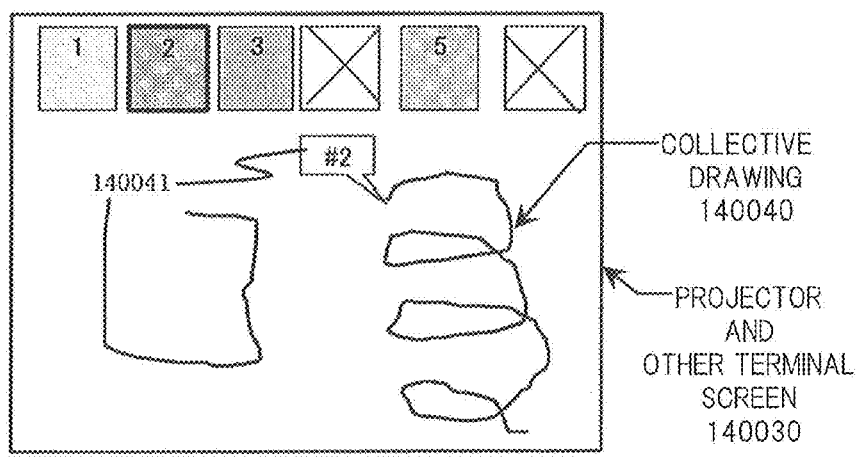

FIGS. 14A to 14C are explanatory diagrams each illustrating a method of collectively displaying the drawing lines drawn by the attendees after all line images of a certain unit are drawn without displaying the drawing lines in real time including the state during the drawing, in the figure input/display apparatus and the portable terminal according to the present invention.

FIG. 14A illustrates the display screen 140000 of one terminal. Here, a right drawing line drawing 140011 indicates that the attendee is during the input of the line drawing with a pen 140011 on this terminal. Here, an operation mode of this terminal is switched to a SUBMIT mode by a method described later in FIG. 15, and therefore, the line drawn on the terminal is divided instantly into the line segments but not transmitted by the terminal in this state until an operator of the terminal completes a series of the drawing and collectively transmits the drawing data.

FIG. 14B illustrates the projection screen 140030 of the projector in a state in which the attendee is drawing in FIG. 14A. As described above, because the drawing data has not been transmitted from the terminal yet, the projector displays nothing on its screen.

FIG. 14C illustrates a screen in a state of completion of the series of drawing by the operator in FIG. 14A followed by the touching of the "SUBMIT" button with the pen or finger because of a demand for the display. This screen is similarly viewed in the projector and a different terminal, on which the line images with a certain length inputted in FIG. 14A are collectively drawn and displayed (140040). At this time, in order to indicate the input by the user of the terminal #2, a balloon message 140041 indicating the drawing on the terminal #2 is displayed here for a certain period of time after the collective drawing as described in FIG. 10C, the balloon message disappears after being displayed for a certain period of time as similar to the embodiment which has been already described, and the line with the previously-set color is displayed.

Figure 15:
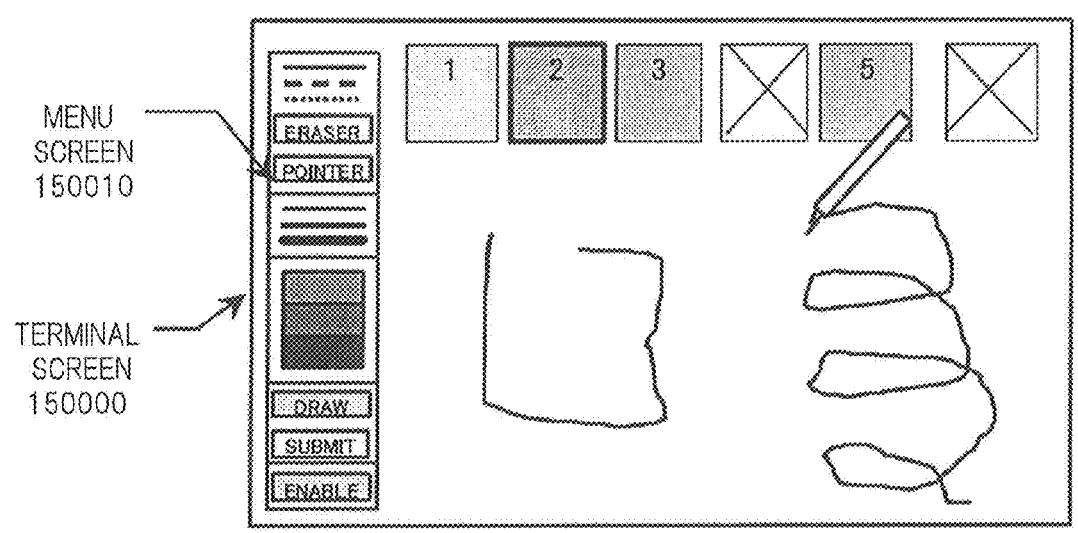
FIG. 15 is an explanatory diagram illustrating an example of a display screen of a terminal in the figure input/display apparatus and the portable terminal.

FIG. 15 is an explanatory diagram illustrating an example of a display screen of a terminal in the figure input/display apparatus and the portable terminal according to the present invention.

Although omitted in drawings up to here, a selectable menu screen 150010 for assigning a type of the handwritten line, etc., in the touch-panel-equipped terminal device for handwriting drawing is displayed on a left side on a screen 150000 in this embodiment.

The displayed menu screen includes selection elements of line type (straight line and two types of dotted lines), eraser, and laser pointer mode. In addition to the type of the line, an eraser instead of the pen can delete an already drawn line. By storing even the deletion with the eraser as the line-segment shift data, the drawing before the deletion can also be stored, so that past drawings can be checked at the playback reproduction described in FIG. 13. The laser pointer mode has a feature of direct laser projection not only onto the projector projection screen but also the same operation as the direct laser projection onto the screen of the touch-panel-equipped terminal in hand.

The menu screen also includes selection elements of three types of matters each written with line thickness and line colors. In next selection element, a mode can be switched to a mode for the collective drawing as described in FIG. 14 by selecting the SUBMIT mode with buttons for switching between a "DRAW" mode and a "SUBMIT" mode.

The final selection element is "ENABLE". When a different terminal, particularly a host terminal is set or when the controller of the projector is configured of a single touch-panel-equipped terminal separately from the liquid crystal projector, this "Enable" can control permission/prohibition of the writing/deletion on the whiteboard by a specific terminal, by an instruction issued from the host terminal, and the "Enable" displays a state.

FIG. 16 is an explanatory diagram illustrating the prohibition state of the input/deletion by the specific terminal in the figure input/display apparatus and the portable terminal according to the present invention.

Figure 16A:
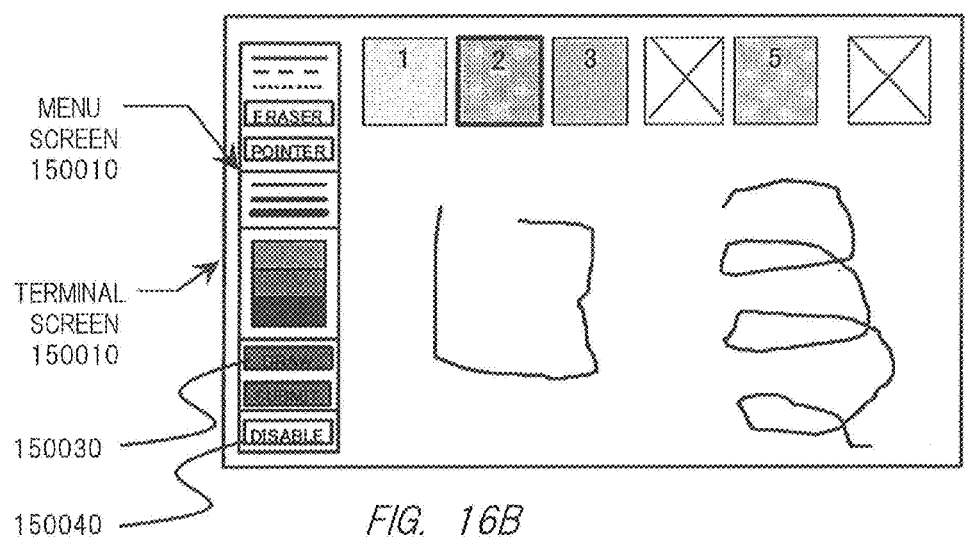
FIGS. 16A and 16B are explanatory diagrams each illustrating a state of prohibition of writing and deletion by a specific terminal, in the figure input/display apparatus and the portable terminal.

FIG. 16A illustrates a screen of a terminal that is prohibited for the input/deletion on the whiteboard in FIG. 15, and "ENABLE" illustrated in FIG. 16 is changed to "DISABLE" (160030). At the same time, the "DRAW" and "SUBMIT" buttons indicating input modes are masked to disable the user from inputting data to the terminal.

Figure 16B:
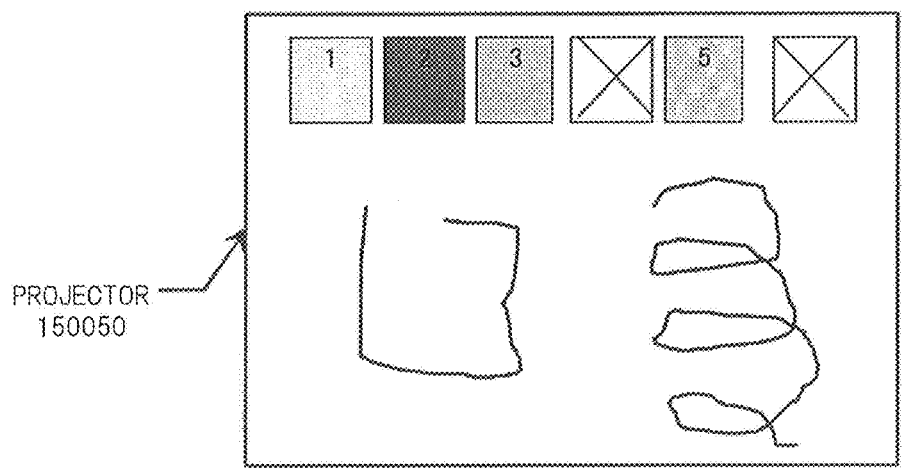

FIG. 16B illustrates a projector display screen 160050 viewed when the terminal #2 is in the prohibition state of the input/deletion in FIG. 16A. This screen is displayed also on other terminals.

The icon of the terminal #2 is painted in a color darker than a predetermined color. This allows other attendees to know that the terminal #2 cannot input from displays on other terminals and the projector.

Figure 17A:
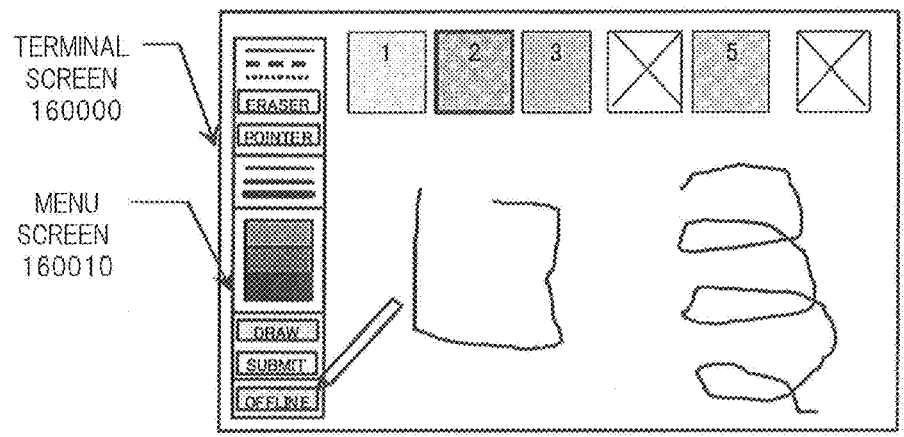
FIGS. 17A to 17C are explanatory diagrams each illustrating a method of temporarily suspending a terminal operation based on an intention of an operator, in the figure input/display apparatus and the portable terminal.
Figure 17B:
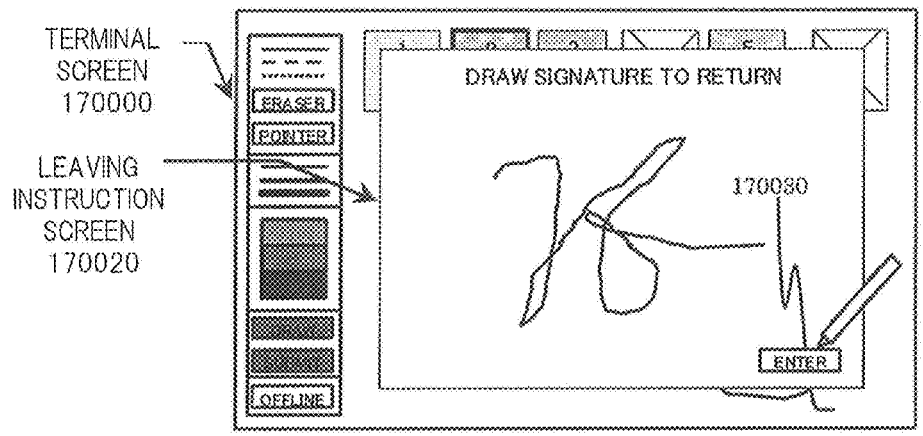
Figure 17C:
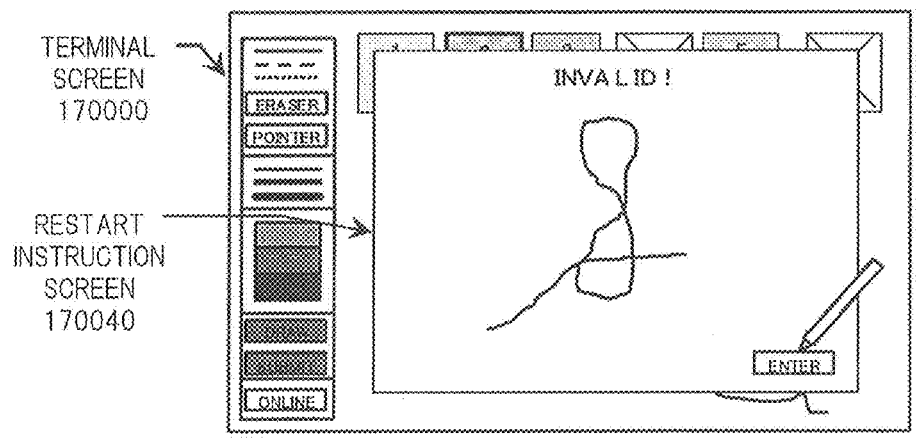

FIGS. 17A to 17C are explanatory diagrams each illustrating a method of temporarily suspending the operation of the terminal by an intention of the operator in the figure input/display apparatus and the portable terminal of according to the present invention.

FIG. 17A illustrates items in a menu screen 170010, the items being operated by an operator on the terminal screen 170000 of a terminal of the operator who temporarily leaves from the meeting during the meeting. By selecting "OFFLINE" by the operator, it is controlled that input/deletion operations on this terminal cannot be performed, and that the whiteboard image displayed on the screen is invisible. Through this operation, when the operator temporarily leaves his/her seat during the meeting such that the operator leaves the terminal there, input and deletion operation by other attendees can be prevented. Alternatively, when the operator brings the terminal out of the meeting and puts it on his/her own desk, anyone other than the meeting attendees cannot view the whiteboard and input/deletion thereon even if the connection of the terminal through the wireless LAN is maintained.

FIG. 17B illustrates a terminal screen viewed after the operator presses the "OFFLINE" button to temporarily leave his/her seat during the meeting. In this embodiment, in order to achieve a function of individually locking the terminal every time the attendee temporarily leaves the seat, a temporary leave instruction screen 170020 is displayed on the screen to prompt the attendee to enter an electronic signature that is used when the attendee return to the meeting. Entering the electronic signature and pressing the "ENTER" button on a lower right side of the temporary leave instruction screen shifts the terminal screen to a screen indicating the state of the temporary leaving from the seat so as to display a restart instruction screen having the same layout as that of the temporary leave instruction screen and so being positioned so as to cover the all drawings on the whiteboard. A feature point of the entered electronic signature is detected and is stored, and is used to verify the entered electronic signature with an electronic signature entered for the restart instruction described in FIG. 17C.

FIG. 17C is a diagram illustrating the entering of the electronic signature onto a restart instruction screen 170040 in a case of entering of a different electronic signature. Even when the electronic signature is entered and the "ENTER" button is pressed, a message "INVALID!" is displayed on the terminal because the entered electronic signature is different from the electronic signature of FIG. 17B, and therefore, the restart is not permitted. In a case of entering of a correct electronic signature, the restart instruction screen disappears, and the screen returns to the screen viewed before the temporary leave on which the whiteboard image is displayed.

Figure 18A:
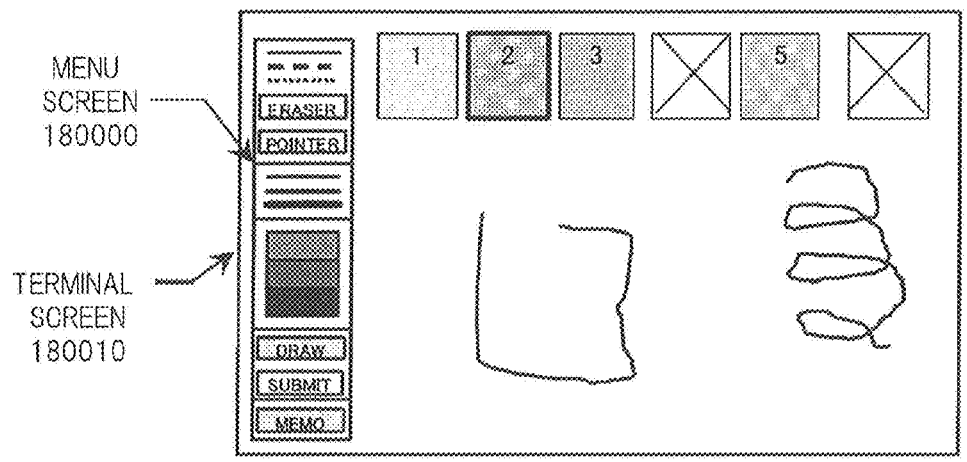
FIGS. 18A to 18C are explanatory diagrams each illustrating a screen on which the operator at each terminal personally takes a memo (note), in the figure input/display apparatus and the portable terminal.
Figure 18B:
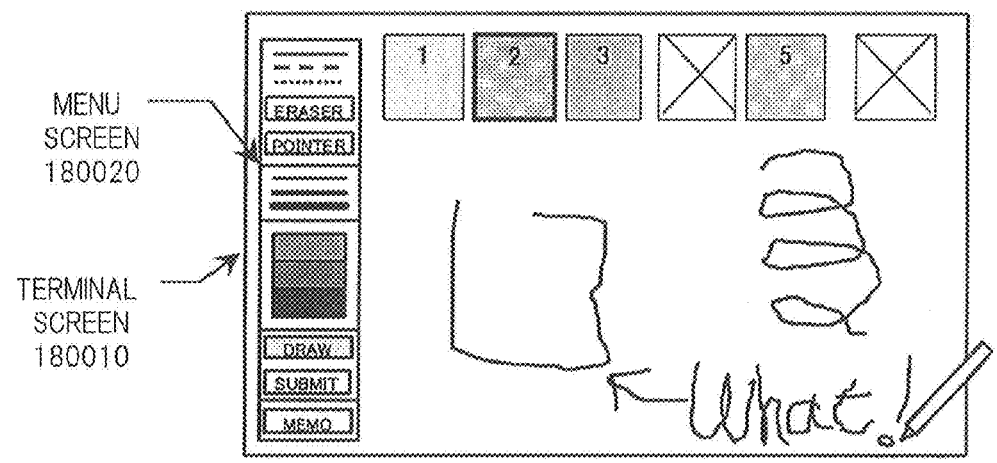
Figure 18C:
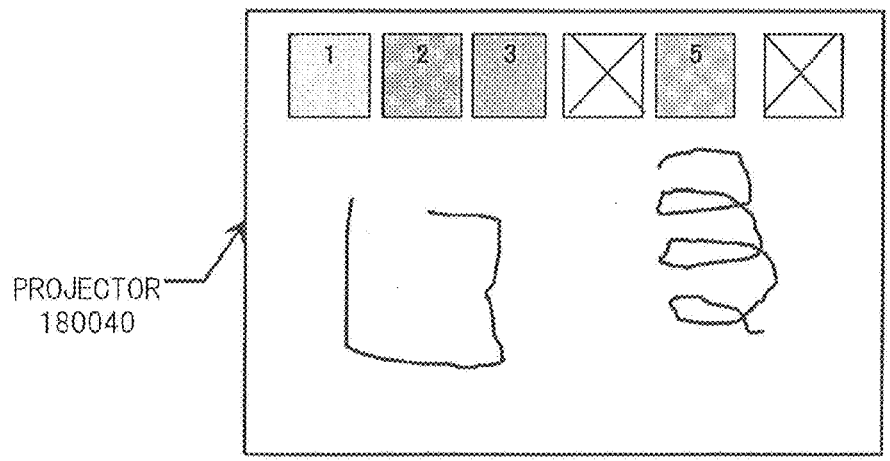

FIGS. 18A to 18C are explanatory diagrams each illustrating a screen on which the operator of each terminal records a personal memo in the figure input/display apparatus and the portable terminal according to the present invention.

In FIG. 18A, pressing a "MEMO" button partially provided on a menu screen 180000 switches a mode to a "MEMO" mode.

FIG. 18B illustrates a screen for input to the terminal in the "MEMO" mode. A line drawing written a terminal screen 180030 is a memo for only the operator of the terminal. This memo is not displayed on a projector screen 180040 illustrated in FIG. 18C and on the screens of other terminals.

Although not illustrated, the format of this memo data is the same as that of the line-segment packet data described in FIG. 2 and other drawings. This data contains link information indicating such a time-axis direction relation as particularly indicating what time (at which packet display) the separately-stored line-segment packet data of the whiteboard is inputted, the line information being added to packet data. When the memo is displayed, the memo can be displayed so as to overlap with the play back as described in FIG. 13, and therefore, the whiteboard image which is referred to by all attendees and the operator's own memo can be displayed not only on the current screen but also on a screen in the past so as to be played back.

Figure 19A:
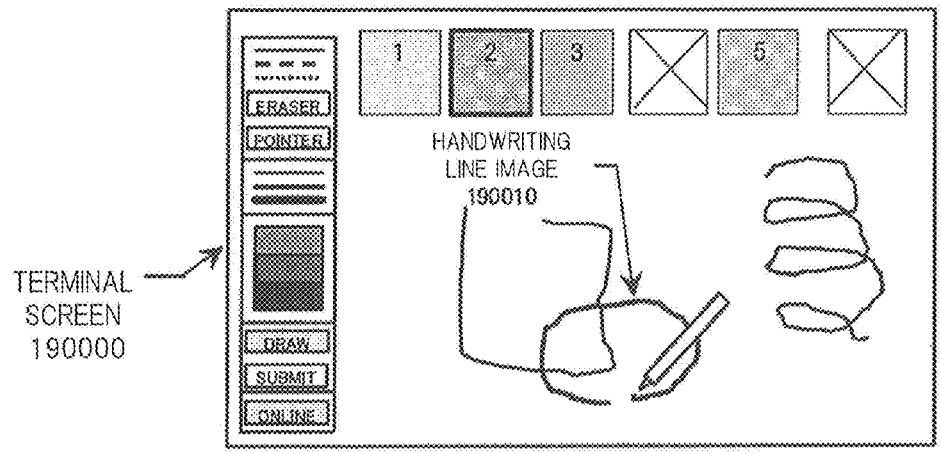
FIGS. 19A to 19C are explanatory diagrams each illustrating a screen on which a standard figure is fairly automatically copied out, in the figure input/display apparatus and the portable terminal.

FIG. 19 is an explanatory diagram illustrating a screen on which a clean copy of a standard figure is automatically made, in the figure input/display apparatus and the portable terminal according to the present invention.

On a terminal screen 190000, a line having a standard drawing form may be used so that an attention point on the drawing during the meeting is surrounded with a circle or is emphasized with two underlines when the attention point is characters.

Figure 19B:
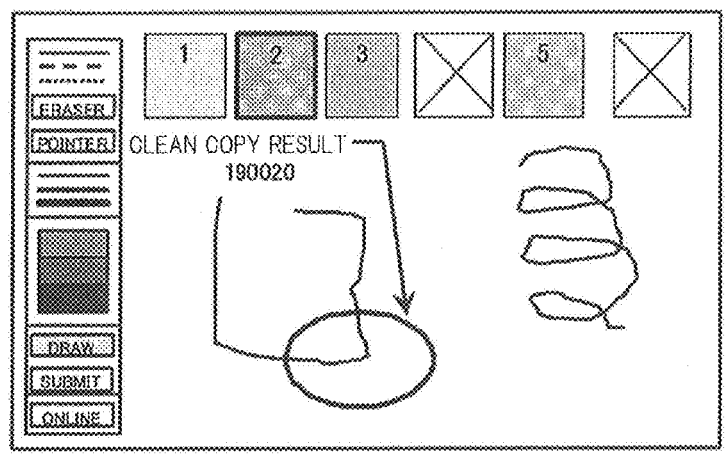
Figure 19C:
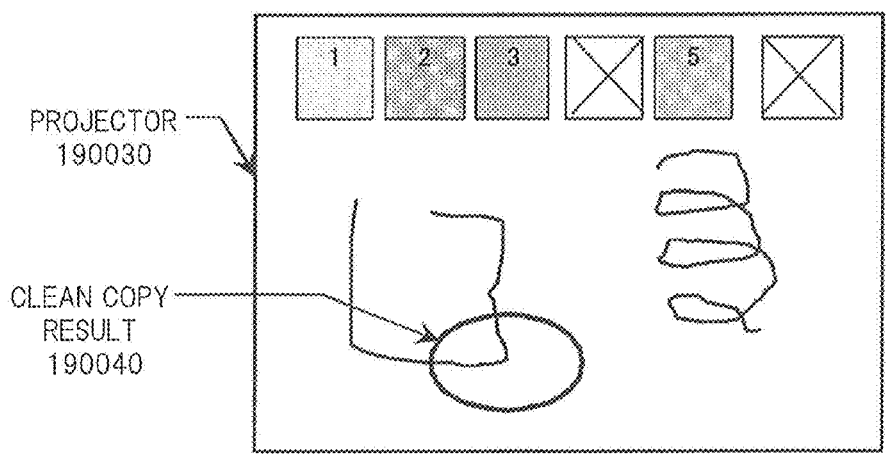

For these line drawings, there is no particular meaning in minute difference in a shape, and a properly and correctly drawing figure is more effective. In this embodiment, a circle drawn so as to partially emphasize a figure as illustrated as a handwritten line drawing 190010 is automatically recognized as not a figure but the emphasizing mark, and is rewritten into a correct ellipse as a clean copy result 190020, so that disorder of a layout of the whiteboard input in the handwriting can be fairly corrected. Such a clean copy is displayed also on the projector as illustrated in FIG. 19C.

Although not illustrated, for the stored data packet, in addition to the method of the storage after the division into the line segment data, the data may be stored as packet data containing such a central point coordinate and a diameter value as expressing the standard figure.

Figure 20A:
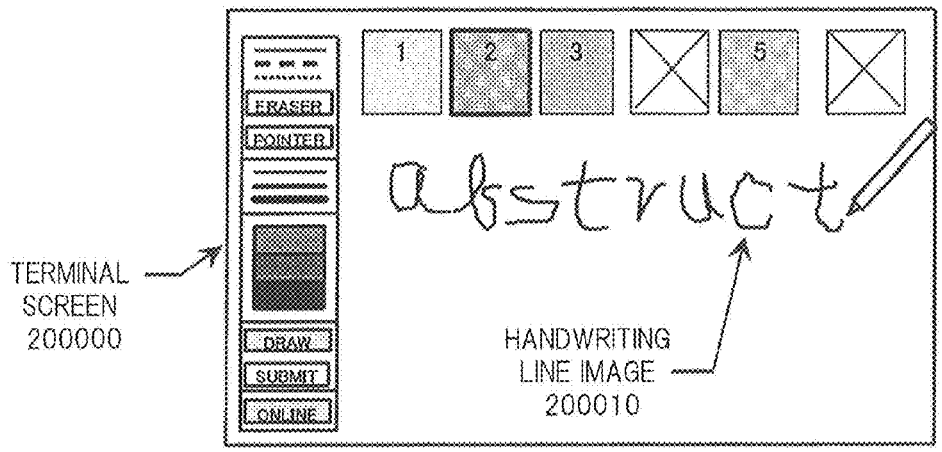
FIGS. 20A to 20C are explanatory diagrams each illustrating a screen example for character input, in the figure input/display apparatus and the portable terminal.
Figure 20B:
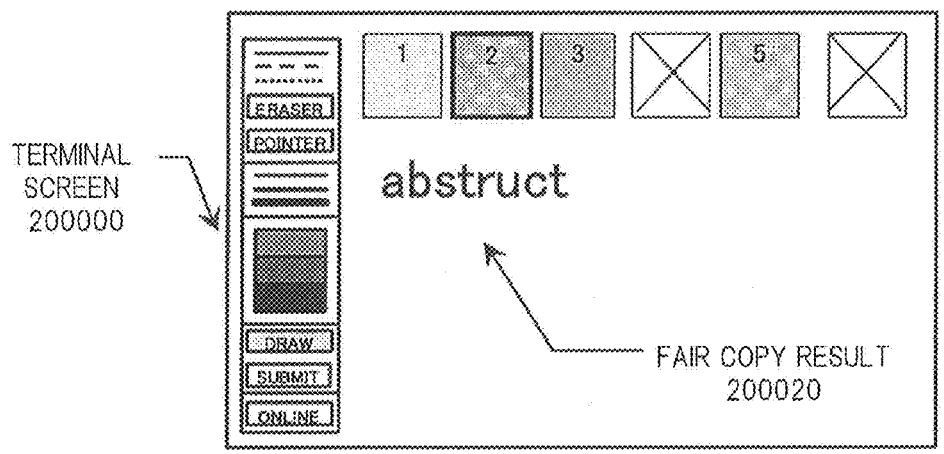
Figure 20C:
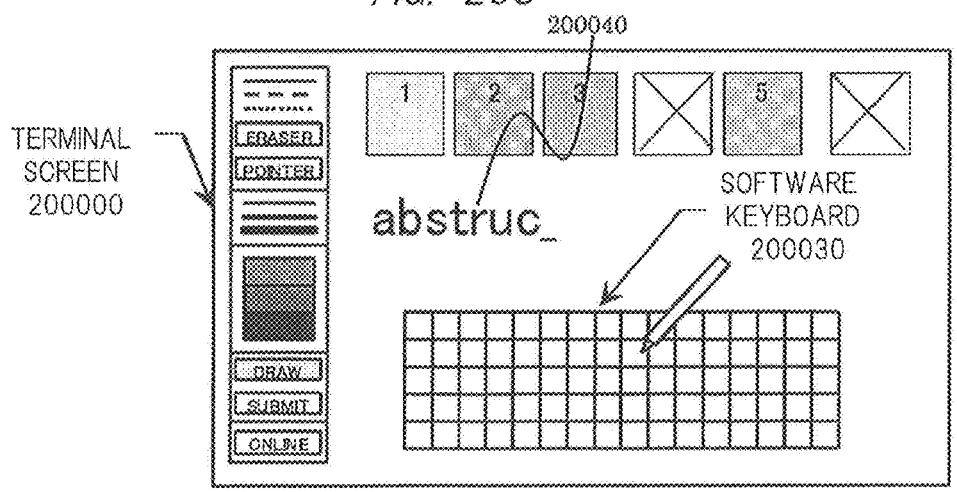

FIGS. 20A to 20C are explanatory diagrams each illustrating an example of a character input screen, in the figure input/display apparatus and the portable terminal according to the present invention.

At a meeting using the whiteboard, all data is basically handwritten. In the case of the character input, the line drawing is handled as digital information, and therefore, failure to be legible of the line drawing due to a poor quality of the characters of a writer can be prevented because.

FIG. 20A illustrates a terminal screen 200000 on which characters are inputted in handwriting. Because the characters are inputted with a handwritten line drawing 200010, while the characters have the personality of the writer, the characters are never readable in many cases. As illustrated in FIG. 19B, the inputted characters are converted into character codes automatically or by a selection/conversion operation by the writer using a line drawing/character conversion function accompanied by an OCR (Optical Character Reader), and are cleanly copied and displayed as a character string corresponding to the character codes (20020). In this manner, the input characters difficult to read are automatically converted in some cases, so that the environment of the meeting using the whiteboard can be improved.

Although not illustrated, the input characters may be stored as not the line drawing but the character code in the stored data packet as similar to the case illustrated in FIG. 19C in such a format as the start point coordinates of the character string, a character size, and a character code string.

FIG. 20C illustrates a method for clean copy by not the handwriting input from the beginning but direct character input using a software keyboard in the character input. For example, particularly when a general-purpose portable terminal is used at an official meeting, if a program is so configured that the characters are incorporated into the whiteboard application via the dedicated API and OS using a built-in software keyboard 200030 as standard equipment, the cleanly-copied characters can be easily displayed (200040). The method of storing the input character data is the same as the method described in FIG. 20B.

Figure 21:
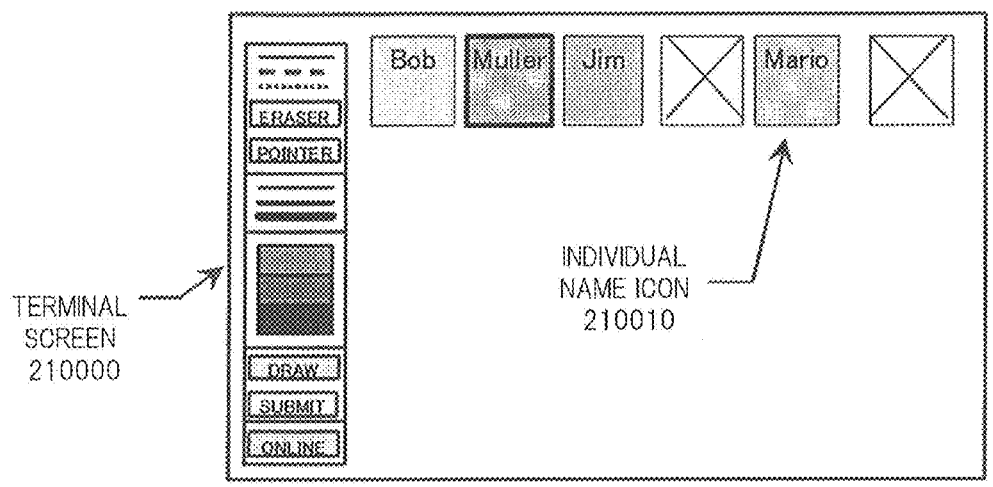
FIG. 21 is an explanatory diagram illustrating an example of display of IDs of meeting attendees, in the figure input/display apparatus and the portable terminal.

FIG. 21 is an explanatory diagram illustrating an example of display of the IDs of meeting attendees, in the figure input/display apparatus and the portable terminal according to the present invention.

In the diagrams described above, the meeting attendees displayed on the projector and terminals are represented by terminal ID numbers. At the start of the meeting or when each attendee brings and uses a portable terminal owned by the attendee his/herself at the meeting, not the terminal ID but a name of the attendee can be directly displayed as an individual name icon 210010. This display is achieved by inputting his/her name by each attendee in the method described in FIGS. 20A to 20C at the start of the meeting.

Figure 22:
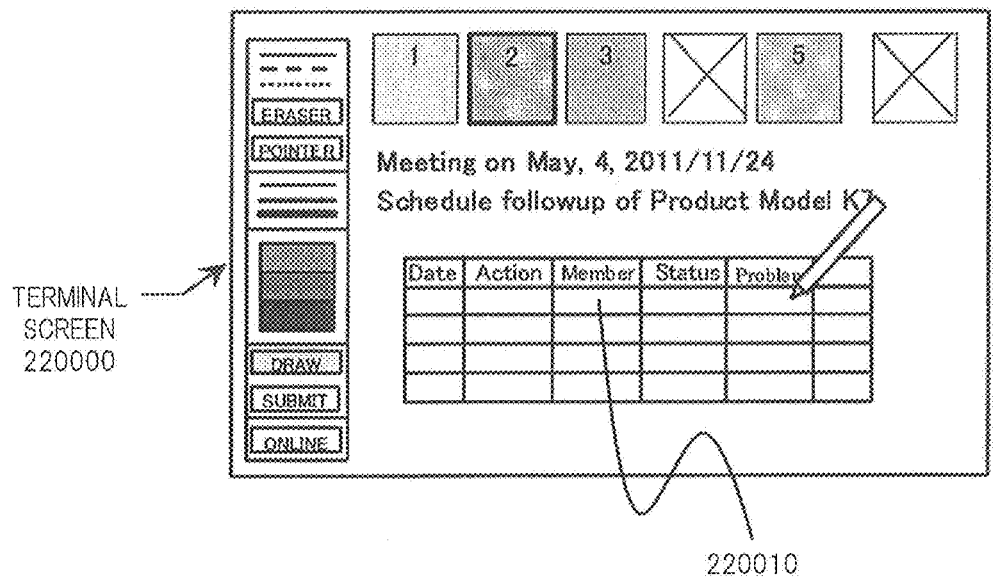
FIG. 22 is an explanatory diagram illustrating an example in a case of previous screen setting at start of a meeting in the figure input/display apparatus and the portable terminal.

FIG. 22 is an explanatory diagram of an example in which a screen at the start of a meeting is previously set, in the figure input/display apparatus and the portable terminal according to the present invention.

In many cases of a conventional meeting using the whiteboard, a meeting host previously writes a subject, a date, a proceedings list, etc., on the whiteboard, and then, starts the meeting. This embodiment describes a function of previously writing documents necessary for proceedings (220010) before the start of the meeting by a specific attendee (host) using the handwrite drawing or the cleancopy function of FIGS. 20A to 20C for hosting the meeting.

As the previously-written information, characters and drawings as well as diagrams such as a schedule control table, copied from a page of spreadsheet software can be prepared. Obviously, the stored line-segment packet data from previous meetings may also be drawn as a part continued from the previous meeting.

When individual names are inputted in such a table as illustrated in FIG. 22, a UI for direct input although not illustrated is convenient, the direct input being achieved by dragging an individual name icon with a pen to bring the icon to a "Member" space in the table because the individual name is written in the name icon of FIG. 21. All of these operations can be achieved by a processing of the application software of the figure input/display apparatus.

Figures 23A, 23B:
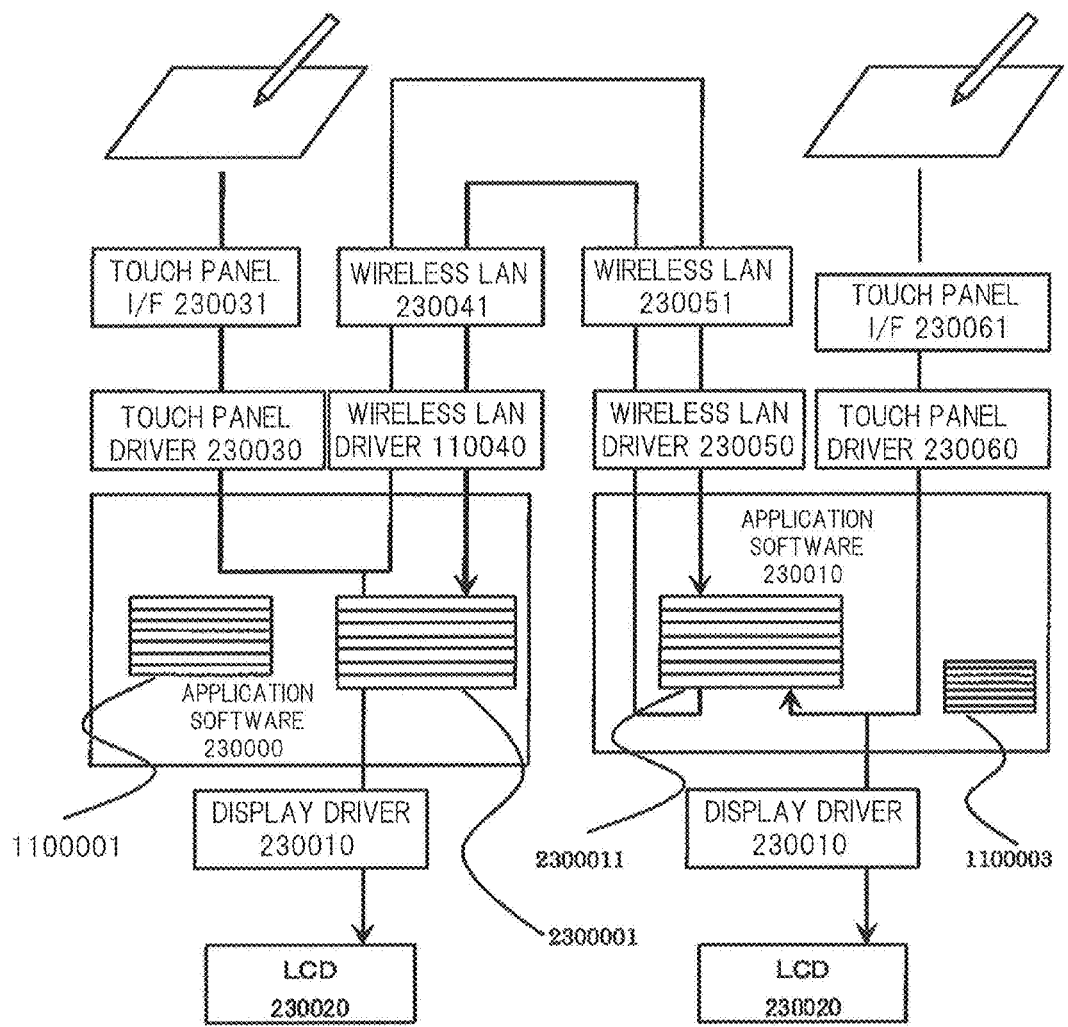
FIGS. 23A and 23B are explanatory diagrams of a terminal interior structure in a case where specific terminals make an exclusive conversation with each other during a meeting, using equipment configuring the figure input/display apparatus and the portable terminal.

FIGS. 23A and 23B are explanatory diagrams each illustrating a terminal interior structure in a case of conversation only between specific terminals during the meeting using the component devices in the figure input/display apparatus and the portable terminal according to the present invention.

In this embodiment, the configuration and flow of data in the terminal in the conversation only between the specific terminals described in FIG. 9. An application of a first terminal on the left includes a line-segment data packet 1100001, and an application of a second terminal on the right includes a line-segment data packet 1100003. These packets are data packets storing the drawing data to be displayed on the whiteboard shared by the controller and all touch-panel-equipped terminals, as described in FIG. 11.

In this embodiment, in addition to the above-described data packets, the first terminal and the second terminal have line-segment data packets (2300001 and 2300011) storing the line drawings written on the chat board described in FIG. 9C as similar to the whiteboard data. These data packets are independent from the above-described data packets storing the drawing data to be displayed on the whiteboard, and are the data packets which are not displayed on the whiteboard but are for recording the conversation using the line drawings between the first and second terminals.

Figure 9D:
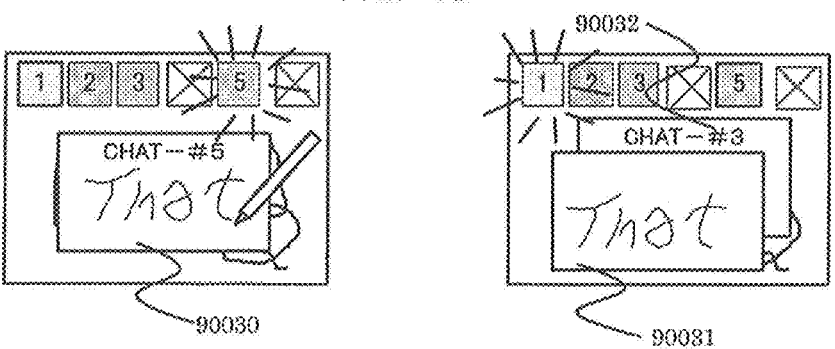

As seen in the terminal illustrated on the right in FIG. 9D, when the terminal simultaneously makes the conversation with a plurality of terminals, the terminal has the above-described data packets (2300001 and 2300011) as much as the number of the counterpart terminals.

The line-segment data packet indicating the line drawing on the chat board is transmitted as a meeting result by the first and second terminals in the method same as the method of the collective drawing described in FIG. 14 to the whiteboard data shared by all attendees as it is, so that the transmitted data is displayed on the whiteboard and the screens of all terminals, and can be stored in the line-segment data packet as the proceedings data of the meeting.

Figure 24A:
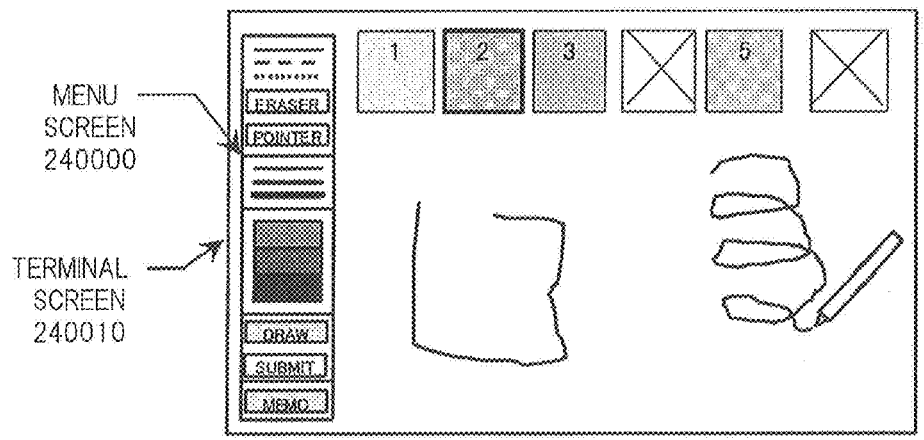
FIGS. 24A to 24C are explanatory diagrams each illustrating an operation related to automatic scale change, in the figure input/display apparatus and the portable terminal.
Figure 24B:
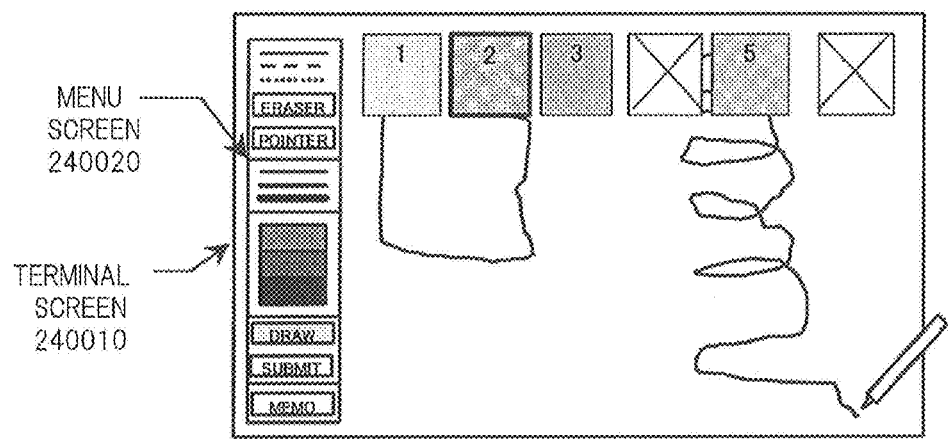
Figure 24C:
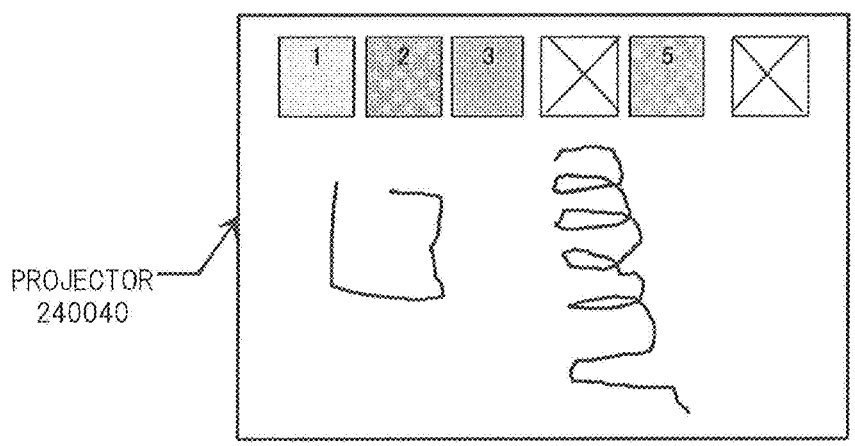

FIGS. 24A to 24C are explanatory diagrams each illustrating an operation related to automatic scale change in the figure input/display apparatus and the portable terminal according to the present invention.

This embodiment describes an operation in a case in which a size of a whiteboard image shared by all meeting attendees is not a size of a fixed number of pixels to be matched with the size of the portable terminal or whiteboard but an image size larger than such a size.

FIG. 24A illustrates a screen of the touch-panel-equipped terminal device described above. As illustrated in FIG. 24B, when a line is further drawn so as to extend out of the screen of FIG. 24A, the screen of the touch-panel-equipped terminal device is scrolled automatically to allow the user to perform the input on a whiteboard with a larger image size.

At this time, a whiteboard image projected by the projector is automatically displayed in reduced-size display so that the whole of the drawn line is displayed as illustrated in FIG. 24C. Also in other terminals, the display is similarly automatically transferred to the reduced-size display. However, the display can be switched to enlarged-size display through a menu not illustrated in each terminal, and besides, the display can be switched from the reduced-size display as illustrated in FIG. 24C to the same enlarged-size display as the terminal display in FIG. 24B by issuing instruction for the enlarged-size display from each terminal to the controller.

Figure 25:
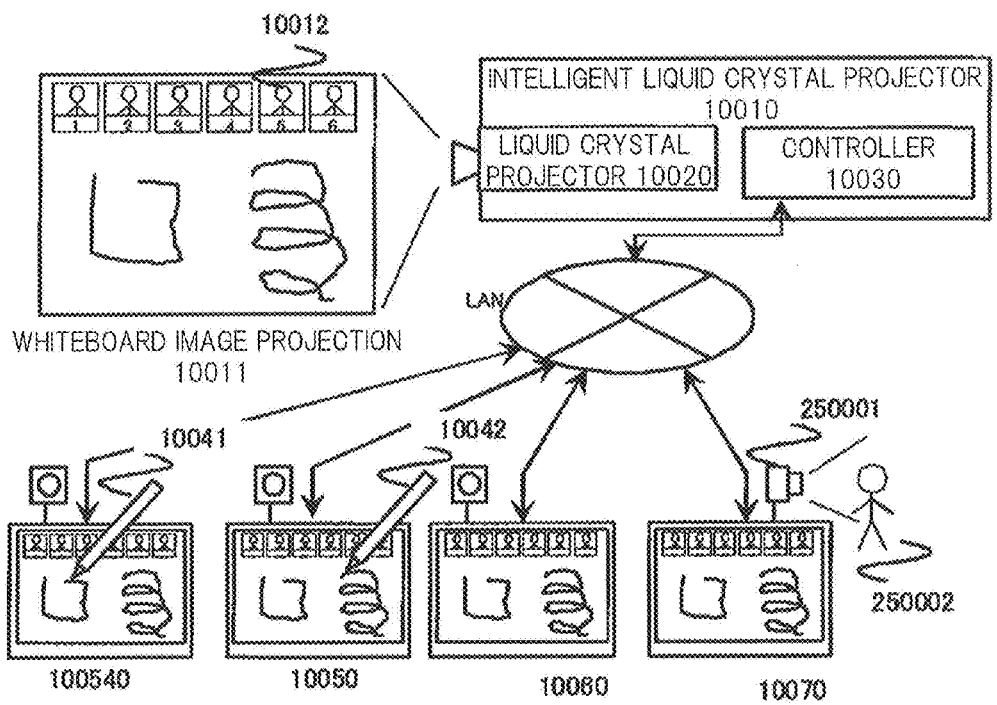
FIG. 25 is an explanatory diagram illustrating an attendee check operation using a camera, in the figure input/display apparatus and the portable terminal.

FIG. 25 is an explanatory diagram of an attendee check operation using a camera in the figure input/display apparatus and the portable terminal according to the present invention.

The operations of the intelligent liquid crystal projector 10010 and the touch-panel-equipped terminals (10040 to 10070) used by meeting attendees are the same as the operations of FIG. 1, and therefore, are omitted in further description.

This embodiment has a feature that an icon 10012 of an attendee 250002 indicating the condition of each of the touch-panel-equipped terminals (10040 to 10070) exhibits an image of the attendee his/herself imaged by a camera 250001 embedded in or mounted on each of the touch-panel-equipped terminals (10040 to 10070) used by each attendee.

This image may be a still image imaged at the start of the meeting or a moving image constantly imaged during the meeting. The attendees of the meeting are displayed as information shared by all members, so that all members can check who the attends are and whether a person who is not supposed to attend the meeting attends or not.

Figure 26A:
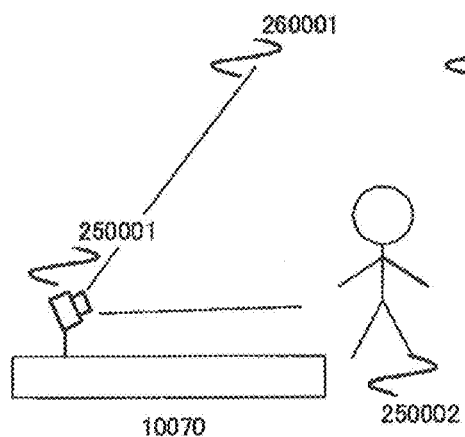
FIGS. 26A and 26B are explanatory diagrams each illustrating a specific operation of a camera unit for the attendee checking using the camera, in the figure input/display apparatus and the portable terminal.
Figure 26B:
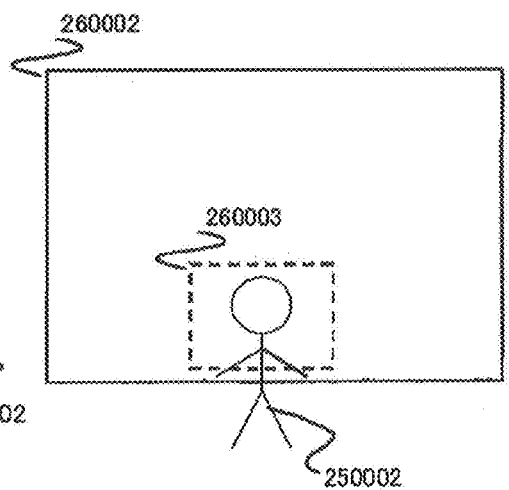

FIGS. 26A and 26B are explanatory diagrams each illustrating the specific operation of a camera unit for checking attendees using a camera in the figure input/display apparatus and the portable terminal according to the present invention.

As illustrated in FIG. 26A, the touch-panel-equipped terminal 10070 of this embodiment has a camera 25001 embedded in or mounted on the touch panel side so that the camera can be used for other applications, such as a TV (video) phone. Usually, a facing direction of the camera 25001 is not movable but fixed so as to reduce the number of components. In such a case, a shooting angle 26001 is significantly wider than that of a wide-angle lens so that an area imaged by the camera 25001 is not limited so much for imaging.

When a picture of an attendee is taken with this camera, the resulting picture of the attendee 250002 is considerably small relative to an imaging area 260002 of the camera. In this embodiment, an image 260003 in vicinity of a face of the attendee is extracted/cut out using a technique known as a face detecting function of the camera in the imaging area 260002, and is displayed in the icon 10012 of FIG. 25. In this manner, an area of the icon relatively small to the whole screen area is utilized effectively to allow each attendee to check the faces of other attendees.

As illustrated in FIG. 25, the shot image may be a still image or moving image. In the case of a still image, data occupation in communication traffic for the image transfer is only temporarily provided at the start of the meeting. In the case of a moving image, other attendee can check various situations, such as switching of an attendee during the meeting and such as, what attendee pays attention to a presentation or input contents on the whiteboard at a certain point of time, so that the meeting can smoothly proceed.

Note that this embodiment can be expressed as follows. That is, the embodiment for a program which is installed in a potable terminal and is executed to communicate with a different portable terminal identified by identification information and with a projector. The program can be functioned as program which controls touch panel means, display means, and transmitting/receiving means so as to divide line drawing information inputted on a touch panel into line segment data at a predetermined interval, generate a line-segment data packet together with attribution information indicating the coordinates of the start point and end point of the line segment data and the type, color, etc., of a drawing line, and transmit the line segment data packet to the projector, which controls the touch panel means, the display means, and the transmitting/receiving means so as to cause the display means to display user information of the different portable terminal identified by the identification information, specify the user information, divide line drawing information inputted on the touch panel into line segment data at a predetermined interval, generate a line-segment data packet together with attribution information indicating the coordinates of the start point and end point of the line segment data and the type, color, etc., of a drawing line, and transmit the line-segment data packet to the user of the different portable terminal, and which controls the display means and the transmitting/receiving means so as to cause the display means to display reception data from the user of the different portable terminal identified by identification information. And, the above-described program may be a program capable of executing a function, on a plurality of terminals, including: storing data delivered from the different portable terminal or the projector in a memory of each terminal; and playing back to past along a time axis and reproducing a course of extension of a drawing line using a line-segment data packet through operation of the portable terminal. And, the above-described program may have a functions of executing a calling process for direct communication only between a first portable terminal that is any terminal among the plurality of portable terminals and a second portable terminal that is another any terminal among them, a program of the second portable terminal which has received the call has a function of responding to the calling process by a program of the first portable terminal, and the programs of the first and second terminals may be able to execute a function of transmitting/receiving data containing attribution information of the coordinates of the start point and end point of a character and figure and the type, color, etc., of a drawing line only between the terminals and displaying the data, using the touch panels and the displays on the terminals, from a period of time of completion of the calling process and the response thereto. The above-described program may be a program capable of executing a function of displaying a list of the IDs of portable terminals connected to a network, using any of an ID number, a color, a pattern, and an image or a combination of them, on the screen of a portable terminal that executes this program. In the above-described program, when a camera facing a user is embedded in or mounted on a portable terminal, the program may be able to execute a function of controlling the camera, taking an image with which the user can be identified, and displaying an image with which a user using the touch panel can be identified on the displayed list of portable terminal IDs. The above-described program may be capable of executing a process of generating and using a partial image by automatically detecting and cutting out a part with which the user can be identified from an image taken by a camera embedded in or mounted on a portable terminal as the image being used to identify the user. Note that the above-described program is an example of the embodiments, and a configuration executed by a program using a software configuration converted from a hardware configuration of the embodiments is also obviously included in the embodiments.

SYMBOL EXPLANATION 10010 intelligent liquid crystal projector
10040 touch-panel-equipped terminal
20040 line-segment packet data

The invention claimed is:

1. A projector capable of communicating with a plurality of portable terminals, comprising:
   a network communication unit that transmits/receives data to/from the plurality of portable terminals; and
   a CPU that performs a processing of analyzing data received from the plurality of portable terminals and generating a display image,
   a projection unit that displays the generated display image,
   wherein data on a character and a figure received by the network communication unit from the plurality of portable terminals has two types of drawing line-type data for drawing the character and the figure and eraser line segment data for deleting line-type data of the character and the figure,
   the network communication unit receives data on a character and a figure received from one portable terminal of the plurality of portable terminals, the CPU analyzes attribute information indicating coordinates of a start point and an end point of a line segment for the character and the figure and including information indicating that a drawing line is either a drawing line type or an eraser line segment to generate the display image, contained in the received data, the projection unit displays the display image, and the network communication unit transmits the data on the character and the figure received from the one portable terminal to other portable terminal of the plurality of portable terminals,
   based on the data on the character and the figure which is the eraser line segment data subsequently received from the one portable terminal, the CPU deletes line-type data of the character and the figure in the display image drawn based on the data on the character and the figure which is the drawing line-type data previously acquired from the other portable terminal of the plurality of portable terminals.

2. The projector according to claim 1,
   wherein the projector transmits the received data including attribute information indicating coordinates of a start point and an end point of the line segment for the character and the figure and including information indicating that a drawing line is either the drawing line type or the eraser line segment in timeline order of reception, to the plurality of portable terminals.

3. The projector according to claim 2,
   wherein the projector transmits the received data including attribute information indicating coordinates of a start point and an end point of the line segment for the character and the figure and including information indicating that the drawing line is either the drawing line type or the eraser line segment in timeline order of reception, to the plurality of portable terminals, and stores the received data in timeline order of reception.

4. The projector according to claim 1,
   wherein the plurality of portable terminals are connected to the projector through wireless communication,
   the projector provides an individual address to each of the plurality of portable terminals, and
   a local area network environment configured of only the projector and the plurality of portable terminals is built so that the plurality of portable terminals are distinguished from each other on network using the individual address for information communication.

5. The projector according to claim 4,
wherein the projector displays a list of IDs of portable terminals connected to the network, using any one of an ID number, color, a pattern, and an image, or some of them, on a screen formed of a character and a figure transmitted to the external output or the portable terminal.

6. A portable terminal capable of communicating with other portable terminal identified by identification information and with a projector, comprising:
a display that displays a character and a figure;
a touch panel that receives an instruction from a user;
a network communication unit that transmits/receives data to/from the other portable terminal and the projector; and
a CPU that analyzes the data and performs display image generation for generating a display image,
wherein the portable terminal generates a line-segment data packet including attribute information indicating coordinates of a start point and an end point of the line segment and including information indicating that a drawing line is either a drawing line type or an eraser line segment, the information being generated based on line-drawing input to the touch panel, and transmits the line-segment data packet to the projector,
the line-segment data packet is the drawing line-type data for drawing the character and the figure if the attribute information indicates that the drawing line is the drawing line type, or the line-segment data packet is the eraser line segment data for erasing deleting the line-type data of the character and the figure if the attribute information indicates that the line-segment data is eraser line segment data, and the eraser line segment data in the projector is data for deleting line-type data of the character and the figure generated based on the eraser line segment data previously received by the projector from other portable terminal,
the CPU analyzes data on the character and the figure transmitted from the projector to generate a display image, and
the display displays the generated display image.

7. The portable terminal according to claim 6,
wherein each of the plurality of portable terminals stores data delivered from the other portable terminal or the projector, in a memory in the each portable terminal, and
a course of extension of a line that is drawn using a line-segment data packet is reproduced so as to play back to past along a time axis through an operation of the each portable terminal.

8. The portable terminal according to claim 6,
wherein a first portable terminal that is any terminal among the plurality of portable terminals has a function of executing a calling process for direct communication only between the first and second terminals, the calling being performed to a second portable terminal that is another any terminal among the portable terminals,
the second portable terminal which has received the call has a function of responding to the calling process by the first portable terminal, and
the first and second terminals each has a function of transmitting/receiving the data containing the attribution information indicating the coordinates of the start point and the end point of the character and the figure and including information indicating that the drawing line is either the drawing line type or the eraser line segment only between the first and second terminals and displaying the data, using touch panels and displays on the terminals, from a period of time of completion of the calling process and the response thereto.

9. The portable terminal according to claim 6,
wherein the portable terminal displays a list of IDs of portable terminals connected to a network, using any one of an ID number, a color, a pattern, and an image or some of them, on a screen of the portable terminal.

10. The portable terminal according to claim 9,
wherein a camera facing a user can be embedded in or mounted on the portable terminal, and the portable terminal has a function of taking an image with which the user can be identified, and displaying an image with which a user using the touch panel can be identified on the displayed list of portable terminal IDs by using the camera.

11. The portable terminal according to claim 10,
wherein the portable terminal generates and uses a partial image by automatically detecting and cutting out a part with which a user can be identified from an image taken by a camera embedded in or mounted on the portable terminal as the image being used to identify the user.

12. A program installed in a portable terminal and executed to communicate with other portable terminal identified by identification information and with a projector,
the program controls a touch panel, a display, and a network communication unit so that the portable terminal generates a line-segment data packet including attribution information indicating coordinates of a start point and an end point of the generated line segment and including information indicating that a drawing line is either a drawing line type or an eraser line segment and transmits the line segment data packet to the projector, and
the line-segment data packet is the drawing line-type data for drawing the character and the figure if the attribute information indicates that the drawing line is the drawing line type, or the line-segment data packet is the eraser line segment data for deleting line-type data of the character and the figure if the attribute information indicates that the drawing line is the erasing line segment, and the erasing line segment data in the projector is data for deleting the line-type data of the character and the figure generated based on the eraser line segment data previously received by the projector from other portable terminal.

13. The program according to claim 12,
the program can execute a function of storing data delivered from the other portable terminal or the projector in a memory of each of the plurality of portable terminals, and reproducing a course of extension of a line that is drawn using a line-segment data packet so as to play back to past along a time axis through operation of the portable terminal.

14. The program according to claim 12,
wherein the program has a function of executing a calling process for direct communication only between a first portable terminal that is any terminal among the plurality of portable terminals and a second portable terminal that is another any terminal among the portable terminals, a program of the second portable terminal which has received the call has a function of responding to the calling process by a program of the first portable terminal, and programs of the first and second terminals can execute a function of transmitting/receiving the data containing the attribution information indicating the coordinates of the start point and the end point of the character and the figure and including information indicating that the drawing line is either a drawing line type or an eraser line segment only between the first and second terminals and displaying the data, using touch panels and displays on the terminals, from a period of time of completion of the calling process and the response thereto.

15. The program according to claim 12, wherein the program can execute a function of displaying a list of IDs of portable terminals connected to a network, using any one of an ID number, a color, a pattern, and an image or some of them, on a screen of a portable terminal on which the program is executed.

16. The program according to claim 15, wherein, when a camera facing a user is embedded in or mounted on the portable terminal, the program can execute a function of controlling the camera, taking an image with which the user can be identified, and displaying an image with which a user using the touch panel can be identified on the displayed list of portable terminal IDs.

17. The program according to claim 16, wherein the program can execute a process of generating and using a partial image by automatically detecting and cutting out a part with which a user can be identified from an image taken by the camera embedded in or mounted on the portable terminal as the image being used to identify the user.

18. A display device capable of communicating with a plurality of portable terminals, comprising:

a network communication unit that transmits/receives data to/from the plurality of portable terminals; and a display that displays a display image, wherein data on a figure drawing received by the network communication unit from the plurality of portable terminals has two types of drawing line-type data for drawing a figure and eraser line segment data for deleting line-type data of the figure, if the network communication unit receives the drawing line-type data from one portable terminal of the plurality of portable terminals, the display displays a display image generated based on the received drawing line-type data, and the network communication unit transmits the drawing line-type data to other portable terminal of the plurality of portable terminals, in the display image of the display, a figure drawn in the display image of the display based on a drawing line-type data previously acquired from other portable terminal of the plurality of portable terminals via the network communication unit is deleted based on an eraser line segment data subsequently received from the one portable terminal via the network communication unit.

19. The display device according to claim 18, further comprising a memory that stores the drawing line-type data and the eraser line segment data received from the plurality of portable terminals via the network communication unit in a form by which timeline order can be understood.

20. The display device according to claim 19, wherein a display image can be changed from the latest display image displayed in the display to a display image that has been displayed in the display in the past by using a series of the drawing line-type data and the eraser line segment data stored in the memory.

21. A portable terminal capable of communicating with a display device and other portable terminal, comprising:

a display;

a touch panel that receives an instruction from a user; and a network communication unit that transmits/receives data to/from the display device and the other portable terminal, wherein the network communication unit transmits a drawing line-type data or an eraser line segment data generated based on line-drawing input to the touch panel, to the display device, the drawing line-type data is data for drawing a figure, the eraser line segment data is data for deleting line-type data of the figure, and the eraser line segment data in the display device is data used for deleting line-type data of a figure generated based on the drawing line-type data previously received by the display device from other portable terminal, and, if the drawing line-type data or the eraser line segment data is received from the display device via the network communication unit, a display image generated by drawing or deleting based on the received drawing line-type data or eraser line segment data is displayed in the display.

22. The portable terminal according to claim 21, further comprising a memory that stores the drawing line-type data and the eraser line segment data received from the display device via the network communication unit in a form by which timeline order can be understood.

23. The portable terminal according to claim 22, wherein a display image can be changed from the latest display image displayed in the display to a display image that has been displayed in the display in the past by using a series of the drawing line-type data and the erasing line type eraser line segment data stored in the memory.

* * * * *